US007145672B2

(12) United States Patent
Tomita et al.

(10) Patent No.: US 7,145,672 B2
(45) Date of Patent: Dec. 5, 2006

(54) IMAGE PROCESSING APPARATUS HAVING A FUNCTION FOR EXECUTING FIRMWARE REWRITING, IMAGE PROCESSING METHOD, AND MANAGEMENT APPARATUS FOR MANAGING THE IMAGE PROCESSING APPARATUS

(75) Inventors: Atsushi Tomita, Toyohashi (JP); Hideki Hino, Toyokawa (JP); Hideo Mae, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 865 days.

(21) Appl. No.: 10/216,429

(22) Filed: Aug. 12, 2002

(65) Prior Publication Data

US 2003/0035132 A1    Feb. 20, 2003

(30) Foreign Application Priority Data

Aug. 14, 2001    (JP)    ............................. 2001-246241

(51) Int. Cl.
G06F 15/00    (2006.01)
(52) U.S. Cl. ...................... 358/1.14; 358/1.15; 714/41; 714/38
(58) Field of Classification Search ................ 358/1.15, 358/1.14; 714/41, 38
See application file for complete search history.

(56) References Cited

U.S. PATENT DOCUMENTS 6,188,487 B1*    2/2001    Matsubara ................. 358/1.15
6,357,021 B1*    3/2002    Kitagawa et al. ............. 714/41
7,058,088 B1*    6/2006    Tomita et al. ............... 370/490
2003/0025927 A1*    2/2003    Hino et al. .................. 358/1.13
2003/0035124 A1*    2/2003    Tomita et al. ............... 358/1.8
2003/0035139 A1*    2/2003    Tomita et al. .............. 358/1.15
2003/0035140 A1*    2/2003    Tomita et al. .............. 358/1.15
2003/0037115 A1*    2/2003    Tomita et al. ............... 709/206
2003/0131083 A1*    7/2003    Inui et al. .................... 709/221

FOREIGN PATENT DOCUMENTS

| EP | 1 003 307 A2 | 5/2000 |
|---|---|---|
| JP | 6-075718 | 3/1994 |
| JP | 06-183109 | 7/1994 |
| JP | 06183109 A * | 7/1994 |
| JP | 08179811 A * | 6/1996 |
| JP | 08-179811 | 7/1996 |
| JP | 08179811 A * | 7/1996 |
| JP | 09-212376 | 8/1997 |
| JP | 10-003413 | 1/1998 |
| JP | 10-157251 | 6/1998 |
| JP | 11-007382 | 1/1999 |
| JP | 11-353136 | 12/1999 |
| JP | 2000-326593 | 11/2000 |

OTHER PUBLICATIONS

Notice on Reason for Rejection issued in a corresponding Japanese application dated Sep. 6, 2005 and translation.

* cited by examiner

*Primary Examiner*—Kimberly Williams
*Assistant Examiner*—Andrew Lam
(74) *Attorney, Agent, or Firm*—Buchanan Ingersoll & Rooney PC

(57) ABSTRACT

An image processing apparatus that is connected to a network generates information about a processing time expected to be required for rewriting firmware in the image processing apparatus to new firmware, and transmits the information via the network to an external apparatus.

16 Claims, 21 Drawing Sheets

| No. | model | e-mail address | other information | |
|-----|---------|----------------------|-------------------|---|
| 1 | model 1 | device1@customer1.com | ... | |
| 2 | model 2 | device2@customer1.com | ... | |
| 3 | model 3 | device3@customer1.com | ... | |
| ⋮ | ⋮ | ⋮ | ⋮ | |

| job number | job type | supplementary information | memory address | client | expected processing time (secs) |
|---|---|---|---|---|---|
| 1 | print job | 123 | 0x1000 | 192.168.0.1 | 30 |
| 2 | print job | 125 | 0x2000 | 192.168.0.2 | 180 |
| 3 | print job | 127 | 0x3000 | 192.168.0.3 | 10 |
| 4 | firmware rewriting job | model1-1 | 0x4000 | 111.123.0.1 | 900 |

311

| number | model | IP address | total expected processing time (secs) |
|---|---|---|---|
| 1 | model1 | 192.168.0.1 | 60 |
| 2 | model2 | 192.168.0.2 | 1800 |
| 3 | model3 | 192.168.0.3 | 300 |
| . | . | . | . |
| . | . | . | . |

IMAGE PROCESSING APPARATUS HAVING A FUNCTION FOR EXECUTING FIRMWARE REWRITING, IMAGE PROCESSING METHOD, AND MANAGEMENT APPARATUS FOR MANAGING THE IMAGE PROCESSING APPARATUS

This application is based on application No. 2001-246241, filed in Japan, the contents of which are hereby incorporated by reference.

BACKGROUND OF THE INVENTION (1) Field of the Invention

The present invention relates to an image processing apparatus, an image processing method, and a management apparatus for managing the image processing apparatus, and in particular to a technique for avoiding delays in executing image processing jobs that are caused by rewriting of firmware in the image processing apparatus.

(2) Related Art

Various methods have been proposed in the related art for upgrading (rewriting) firmware that controls print operations. For example, in one method a printer is connected via a network such as the Internet to an apparatus in a center that is some distance from the printer, firmware is transmitted from the center apparatus to the printer, and the contents of a flash ROM in the printer are rewritten with the transmitted firmware. For reasons of cost, a printer that executes rewriting of its firmware conventionally uses a low-speed serial interface for transmission of firmware. Consequently, with the size of firmware increasing in recent years to be a number of megabytes, rewriting can take tens of minutes. Naturally, print jobs cannot be executed while rewriting takes place.

The fact that firmware is sent from the center apparatus directly to the printer means that although a user using a client terminal to make print job requests to the printer is able to observe the state and wait-time of print jobs in the printer, the user is unable to know about firmware rewriting jobs.

Consequently, there are cases in which the user of a client terminal transmits a print job from a client terminal to the printer having judged that there will only be a short wait, but actually execution of a firmware rewriting job has started before execution of the print job. Therefore the user must wait quite some time for the firmware rewriting job to end. This is extremely inconvenient for the user who is made to wait much longer than expected.

This kind of problem occurs not only with printers, but also with other image processing apparatuses that execute image processing jobs and that have a function of updating their firmware, such as scanners. Furthermore, this kind of problem even occurs when a management apparatus used to manage execution of image processing jobs and firmware rewriting jobs for an image forming apparatus is connected to the image forming apparatus.

SUMMARY OF THE INVENTION

A first object of the present invention is to provide a image processing apparatus the prevents a long wait for an image processing job to be executed caused by firmware rewriting.

A second object is to provide an image processing method that is executed in the image processing apparatus.

A third object is to provide a management apparatus that is connected to an image forming apparatus and that prevents a long wait for an image processing job to be executed caused by firmware rewriting in the image forming apparatus.

The aforementioned first object is achieved by an image processing apparatus that is connected to a network, including: a firmware rewriting unit that executes a firmware rewriting job for rewriting firmware in the image processing apparatus to new firmware; a generation unit that generates information about a processing time expected to be required to execute the firmware rewriting job; and a transmission unit that transmits the generated information to an external apparatus via the network.

According to this construction, a client terminal that is connected to a network, for example, is able to know the state of firmware rewriting in the image processing apparatus. Accordingly, it is possible for the user of the client terminal to avoid using the image processing apparatus, and have an image processing job issued to another image processing apparatus. Therefore, it is unlikely that the user will be caused to wait a long time by the firmware rewriting.

The aforementioned second object is achieved by an image processing method that is executed in a system that includes a client terminal that is connected to plurality of image processing apparatuses via a network, each image processing apparatus including a unit that executes a firmware rewriting job for rewriting firmware in the image processing apparatus to new firmware, and each image processing apparatus executing an image processing job based on the new firmware after rewriting, the method including: a first step of the client terminal requesting each image processing apparatus to transmit information about a total processing time expected to be required to execute all firmware rewriting jobs and image processing jobs that are in a wait-state in the image processing apparatus; a second step of each of the image processing apparatuses receiving the request from the client terminal, and transmitting the information to the client terminal; a third step of the client terminal selecting a transmission destination for an image processing job, based on the received information; and a fourth step of the client terminal transmitting the image processing job to the transmission destination selected at the third step.

According to this construction, if for example firmware rewriting is scheduled for one image processing apparatus, it is possible to issue an image processing job to another image processing apparatus that has few jobs in a wait-state. Therefore, it is unlikely that the user who had image processing job issued will be caused to wait a long time by the firmware rewriting.

The aforementioned third object is achieved by a management apparatus that is connected to an image forming apparatus and that is connected via a network to a client terminal, the image forming apparatus executing a firmware rewriting job for rewriting firmware in the image forming apparatus to new firmware and executing an image processing job based on the new firmware after rewriting, the management apparatus including: a first reception unit that receives a firmware rewriting job from the network; a second reception unit that receives an image processing job from the client terminal; a first transmission unit that transmits the received image processing job to the image forming apparatus when the image forming apparatus is in a state in which an image processing job can be executed, and transmits the received firmware rewriting job to the image forming apparatus when the image forming apparatus is in a state in which a firmware rewriting job can be executed; a generation unit that generates information about a total processing time expected to be required to execute all firmware rewriting jobs and image processing jobs that are in a wait-state in the image forming apparatus; and a second transmission unit that transmits the generated information to the client terminal.

According to this construction, a client terminal that is connected to a network, for example, is able to know the state of firmware rewriting in the image forming apparatus. Accordingly, it is possible for the user of the client terminal to avoid using the image forming apparatus, and have an image processing job issued to another image forming apparatus. Therefore, it is unlikely that the user will be caused to wait a long time by the firmware rewriting.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 8 shows an example of the contents of a registration information table;

FIG. 12 shows an example of the contents of a job management table;

DESCRIPTION OF PREFERRED EMBODIMENTS

The following describes embodiments of an image processing apparatus of the present invention, with reference to the drawings.

First Embodiment 1-1 Overall Structure

Figure 1:
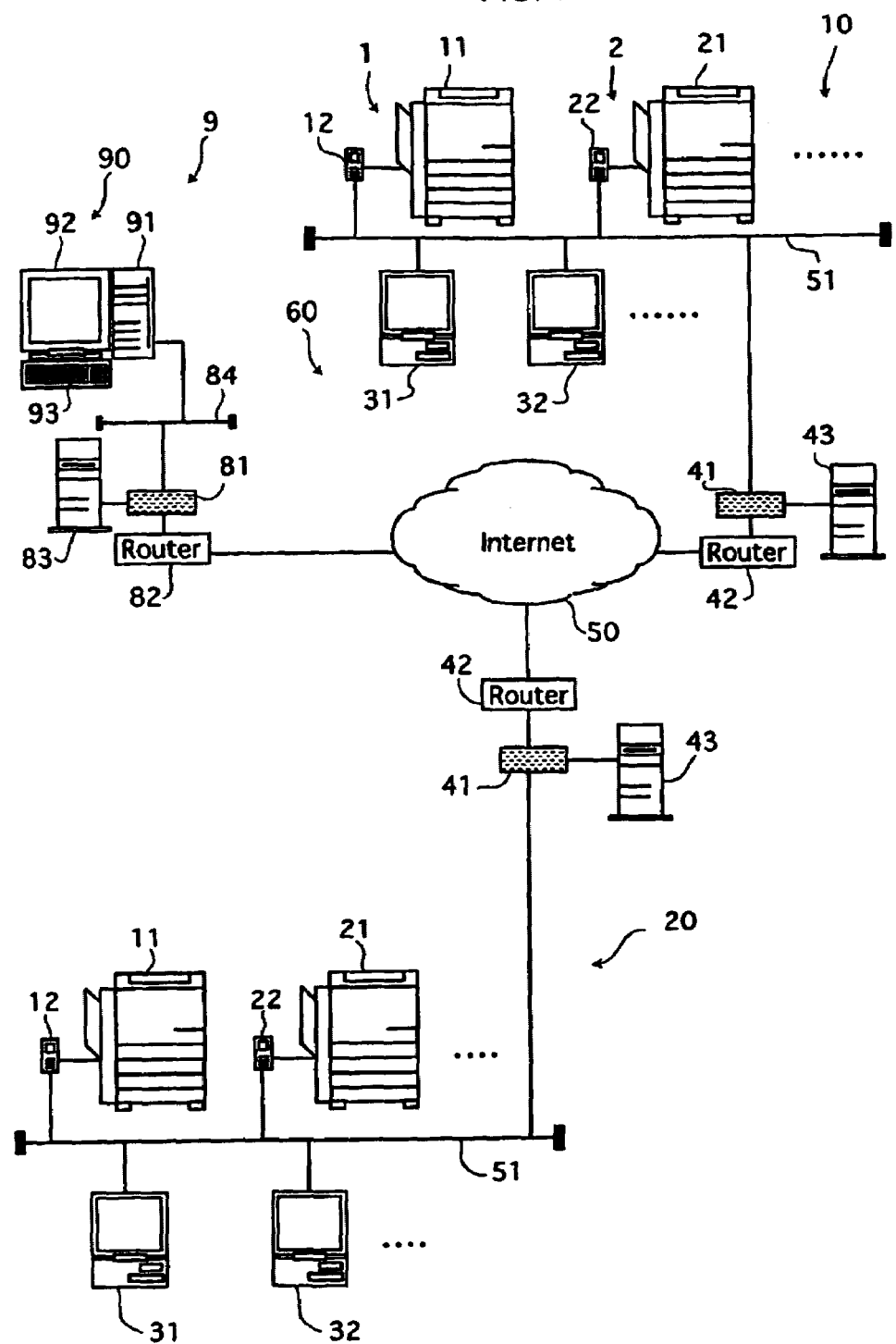
FIG. 1 shows the structure of an image processing system that includes an image processing apparatus in a first embodiment.

FIG. 1 shows the structure of an image processing system 60 (hereinafter simply referred to as "system") that includes the image processing apparatus of the present embodiment.

As the figure shows, the system is composed of a PC (personal computer) 90 that is in a service center 9 and that manages firmware, an apparatus group 10 that is in a user's office or the like and that includes image processing apparatuses 1, 2, etc. and client terminals 31, 32, etc. The PC 90 and the apparatus group 10 are connected here by the Internet 50. In addition, an apparatus group 20 owned by another user is also connected to the Internet 50. Transmission and reception of various types of data such as image data is possible between the apparatuses via the Internet.

In the present embodiment firmware denotes programs that are for controlling hardware devices, and that are basic software executed by the modules (described later) in the image processing apparatus, and control data. The basic software includes activation programs, input/output programs, and control programs for image processing, driving members and the like. The firmware is distributed attached to electronic e-mail (hereinafter "e-mail") to image processing apparatuses by the PC 90.

The client terminals 31, 32, etc. and the image processing apparatuses 1, 2, etc. are connected via a LAN (Local Area Network) 51.

The client terminal 31 is a PC, and is capable of requesting the image processing apparatuses 1, 2 etc. to perform print processing (hereinafter "print job") to print on paper a document or an image that has been created using application software for creating documents, images or the like. Note that this structure is the same as that of the other client terminals 32 etc.

The image processing apparatus 1 includes an image forming apparatus 11 and a printer controller 12 that are connected to each other. The printer controller 12 acts as a management apparatus for managing the image forming apparatus 11.

The printer controller 12 receives requests for print jobs from the client terminals 31, 32, etc. via the LAN 51, and has the image forming apparatus 11 execute the print jobs. In addition, as is described later, the printer controller 12 downloads e-mail from a mail 43 at predetermined intervals, and obtains firmware from e-mail to which the firmware is attached. Then the printer controller 12 gives an instruction to the image processing apparatus 11 to execute a job for rewriting its firmware to the new firmware obtained from the mail (hereinafter "firmware rewriting job"). Note that this structure is the same as that of the other image processing apparatuses 2 etc.

A router 42 is provided in a connection unit that connects the LAN 51 and the Internet 50. As well as mutually connecting the LAN 51 and the Internet 50, the router 42 performs path control. Furthermore, a firewall 41 is provided between the router 42 and the image processing apparatuses 1, 2, etc.

The functions of the firewall 41 include filtering packets and acting as a proxy server. The firewall 41 permits passage only of packets whose transmission origin IP address (host name), destination IP address (host name), transmission origin port number, destination port number, data, and so on fulfill predetermined conditions. Here, communication according to SMTP (Simple-mail Transfer Protocol) is permitted to pass.

Furthermore, the mail server 43 is connected to the LAN 51, and collects and distributes e-mail.

The service center 9, in addition to the PC 90, includes a firewall 81, a router 82, and a mail 83 which are connected to the LAN 84. The firewall 81, the router 82, and the mail server 83 have the same functions as the firewall 41, the router 42, and the mail server 43 respectively.

Note that the apparatuses in the apparatus group 20 have basically the same functions as the apparatuses in the apparatus group 10, and so are given the same reference numbers. Accordingly, a description of the apparatuses in the apparatus group 20 is omitted.

The following describes the various apparatuses. Descriptions are given of the image processing apparatus 1 and the client terminal 31. Description of the other image processing apparatuses and the other client terminals are omitted since they have the same structures as the image processing apparatus 1 and the client terminal 31 respectively.

1-2 Structure of the Client Terminal 31

Figure 2:
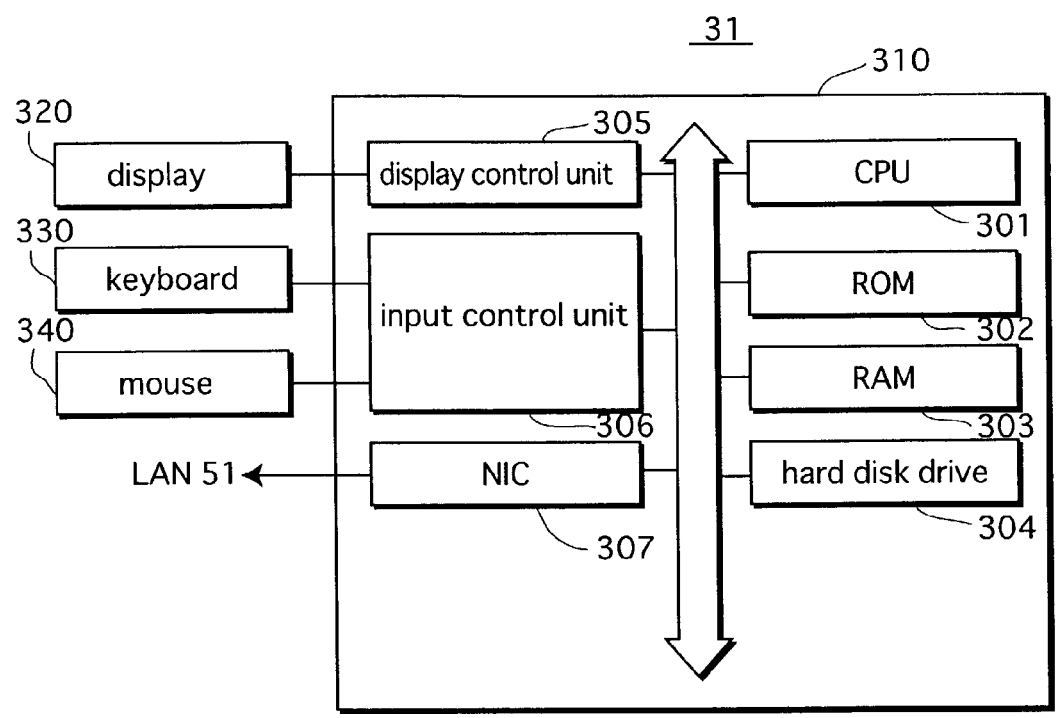
FIG. 2 is a block drawing showing the circuit structure of a client terminal.

FIG. 2 is a block drawing showing the circuit construction of the client terminal 31.

As the figure shows, the client terminal 31 is composed of a computer unit 310, a display 320, a keyboard 330 and a mouse 340.

The computer unit 310 is composed of a CPU (Central Processing Unit) 301, a ROM (Read Only Memory) 302, a RAM (Random Access Memory) 303 that provides a work area, a hard disk drive 304, a display control unit 305, an input control unit 306 and an NIC (Network Interface Card) 307. The display control unit 305 controls display on the display 320. The input control unit 306 receives inputs of signals from the keyboard 330 and the mouse 340. The NIC 307 is for transmitting and receiving various types of data to and from the image processing apparatus 1 etc. via the LAN 51.

The ROM 302 stores application programs for document editing and image editing, print drivers, and so on. The CPU 301 executes these programs and so on.

The print driver creates control information and print job data. This control information is necessary for printing and includes job control information and page control information. The print job information is added to the document or image data to be printed (print data) as a header.

Here, the job control information includes a transmission origin name, a destination name in cases when the user designates the image processing apparatus to execute the job, and the number of copies to be made. The page control information includes the size of the paper to be printed on, print color information showing whether to print in color or monochrome, and paper feeder information showing which feeder paper is to be supplied from. The print data is created in the application programs, but is converted to data which the print controllers 12, 22, etc. are able understand (Page Description Language).

As is described later, on receiving input of a print instruction from the an operation of the keyboard 330 or the like from the user and subsequently making a print job request, the CPU 301 inquires about as to the total length of time expected to execute in succession all print jobs and firmware rewriting jobs that are in a wait state in each image processing apparatus (hereinafter "total expected processing time"). Then the CPU 301 transmits the data of the print job to be executed to the image processing apparatus whose total expected processing time is the shortest. Note that hereinafter processing for transmitting print job data to have executed is referred to as "print job transmission processing", and processing for receiving the sent print job data is referred to as "print job reception processing".

The hard disk drive 304 is a non-volatile memory in which document data, various types of information such as the mail addresses of the image processing apparatuses 1, 2, etc., and a registration information table 311 (described later, see FIG. 18), are stored.

1-3 Structure of the Image Processing Apparatus 1

The image processing apparatus 1 is a so-called MFP (Multi Function Peripheral), and in addition to executing print jobs requested by the client terminals 31, 32, etc., performs functions such as execution of copy jobs and image information transmission jobs. In executing a copy job, the image processing apparatus 1 reads an image of a document that has been set in the image processing apparatus 1 and prints the image on paper. In executing an image information transmission job, the image processing apparatus 1 attaches image information of a read document to e-mail and transmits the mail to a destination designated by the user.

The following describes the structure of the image forming apparatus 11 and the printer controller 12 included in the image processing apparatus 1.

1-3-1 Structure of the Image Forming Apparatus 11

Figure 3:
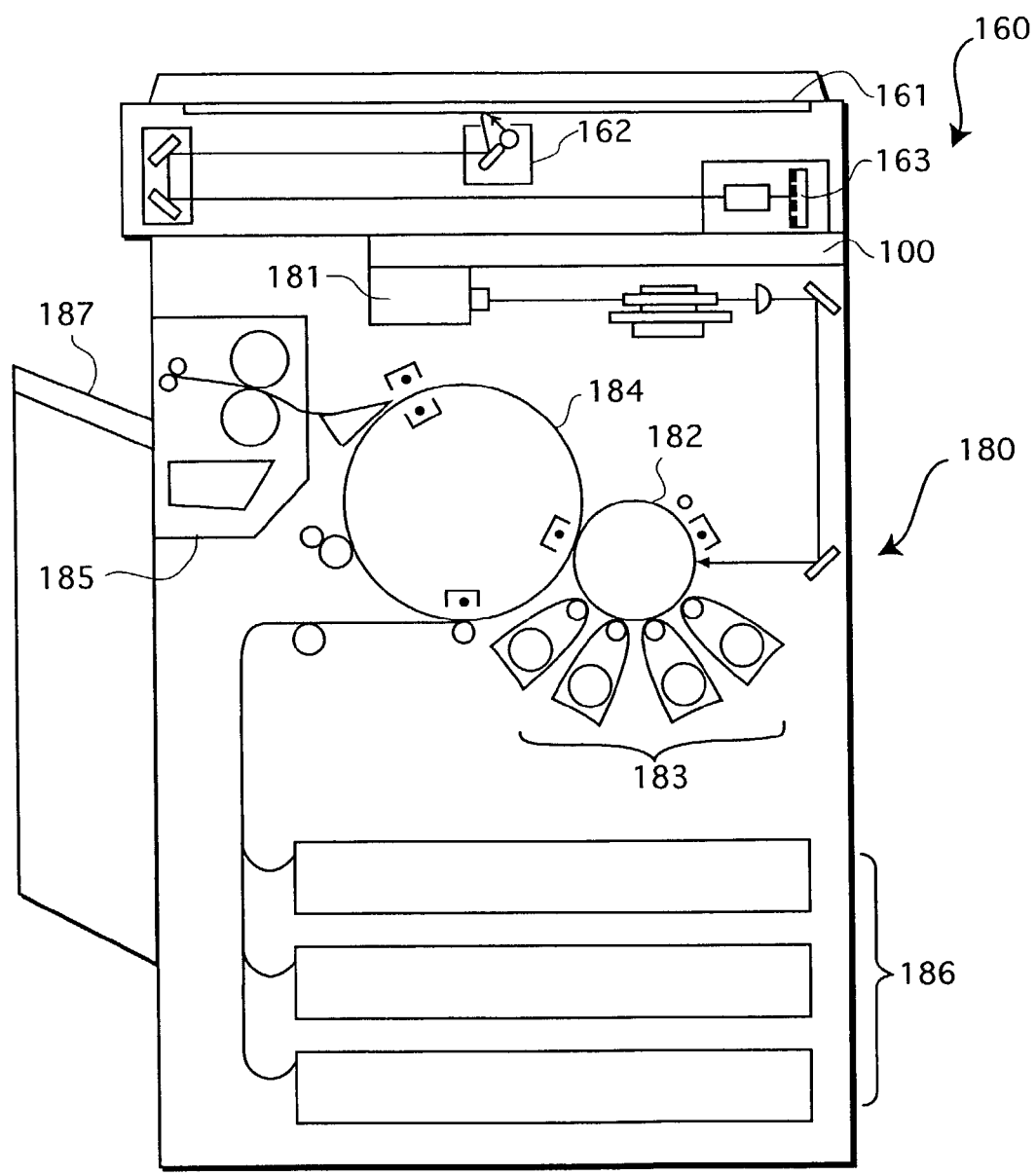
FIG. 3 shows the structure of an image forming apparatus.

FIG. 3 shows the structure of the image forming apparatus 11.

The image forming apparatus 11 forms images according to a commonly-known electrophotgraphic method. The image forming apparatus 11 can be roughly divided into an image reader (IR) unit 160 and a printer unit 180. The image reader unit 160 reads document images. The printer unit 180 prints on paper image data read by the IR unit 160 or sent from the client terminals 31, 32 etc. via the LAN 51.

The IR unit 160 includes a scanner 162 that scans a document set on platen glass 161 by irradiating the document, and a CCD sensor 163 that photoelectrically converts light reflected from the document. The resulting signal is sent to a control unit 100 as image data.

The printer unit 180 includes a print head 181, a photosensitive drum 182, a developing unit 183, a transfer drum 184, a fixing unit 185 and a sheet feeder unit 186.

The print head 181 emits a laser based on a driving signal from the control unit 100, and exposes the light on the photosensitive drum 182. This results in a latent image being formed on the photosensitive drum 182. The latent image is successively developed by cyan (C), magenta (M), yellow (Y) and black (K) developers that are provided in the developing unit 183, to form a toner images. Meanwhile, paper is fed from the sheet feeder unit 186 to the transfer drum 184, and wound around the transfer drum 184. The toner images formed on the photosensitive drum 182 in each color are successively transferred onto the paper wound around the transfer drum 184 so as to be overlaid on each other. After the transfer is complete, the paper is removed from the transfer drum 184 and sent to the fixing unit 185. The toner image on the paper is fixed to the paper by a heater (not illustrated) in the fixing unit 185. After passing through the fixing unit 185, the paper is discharged to an external tray 187. The operations of the IR unit 160 and the printer unit 180 are controlled by the control unit 100.

1-3-2 Structure of the Control Unit 100

Figure 4:
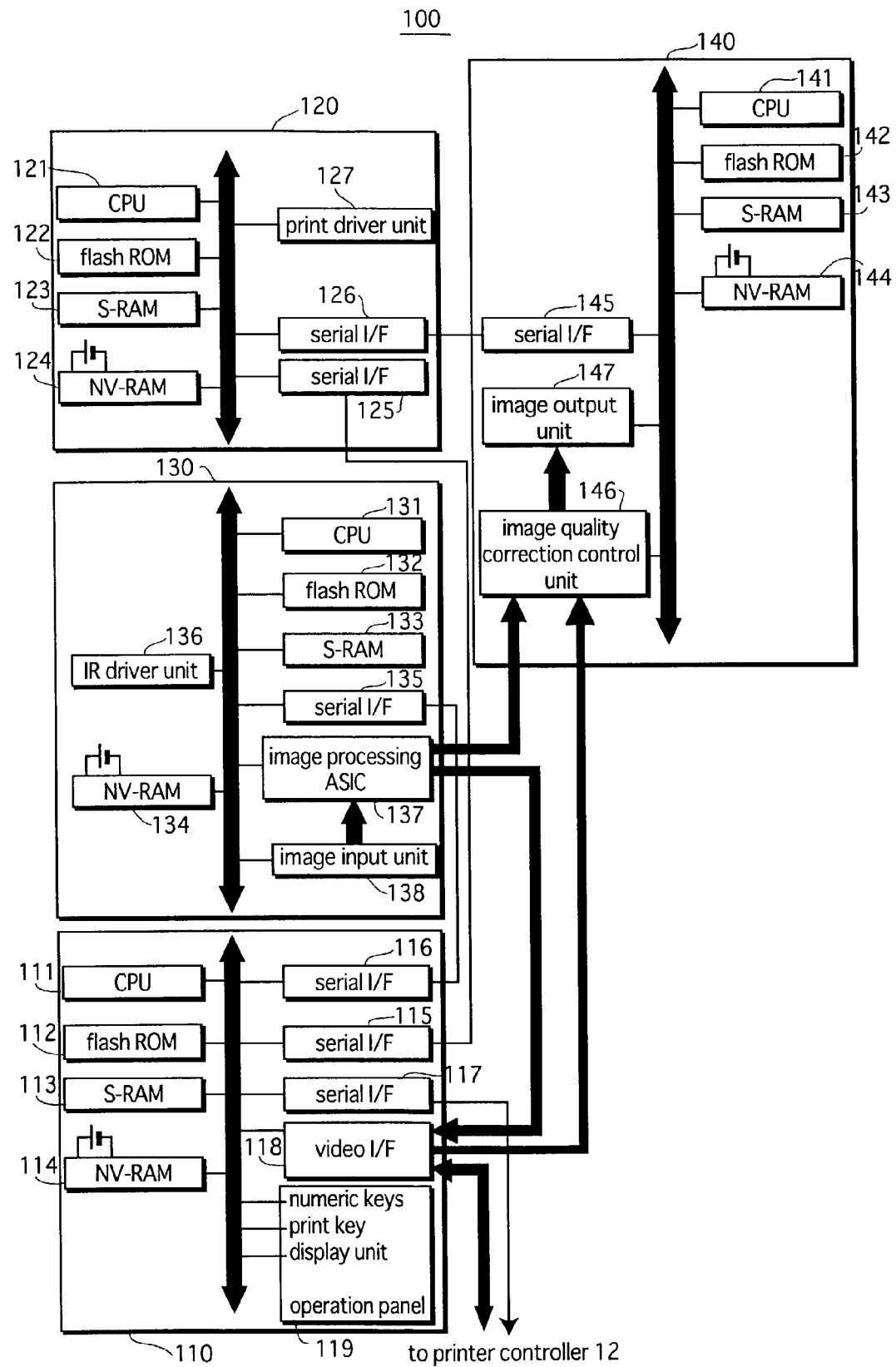
FIG. 4 is a block drawing showing the circuit structure of a control unit of the image forming apparatus.

FIG. 4 is a block drawing of the circuit structure of the control unit 100.

As the figure shows, the control unit 100 is controlled by a multi-CPU system, and is composed of four control modules 110, 120, 130 and 140 that each correspond to one of the CPUs. Here, module denotes a function block that includes a CPU or that includes a control circuit including a CPU, and that executes control functions.

The control module 110 is composed of a CPU 111, a flash ROM 112, an S-RAM (Static Random Access Memory) 113 that provides a work area, an NV-RAM (Non-Volatile Random Access Memory) 114, serial I/Fs 115, 116 and 117, a video I/F 118, and an operation panel 119.

The CPU 111 transmits and receives control commands and the like between the control modules 120 to 140, and performs overall control of the image forming apparatus 11.

The flash ROM 112 is a non-volatile memory whose contents can be electrically rewritten, and stores firmware for the operations of the CPU 111.

The NVRAM 114 is a memory for saving various setting values.

The serial I/F 115 and the serial I/F 116 are interfaces for transmitting and receiving control commands and the like to and from the control module 120 and the control module 130 respectively.

The serial I/F 117 is an interface for transmitting and receiving control commands and the like to and from the printer controller 12.

The operation panel 119 is composed of keys for receiving selection inputs regarding copy jobs and image information transmission jobs, numeric keys, a print key, and a display unit for displaying the content of input and so on. The operation panel 119 is provided in a position where it can be operated easily by the user.

The video I/F 118, on receiving image data for executing a print job from the printer controller 12, outputs the image data to the control module 140.

Note that when executing an image information transmission job, on image data of a read document being received by the video I/F 118 from the control module 130, the CPU 111 performs control to attach the image data to e-mail for a destination designated by the user and transmit the e-mail data from the video I/F 118 to the printer controller 12.

The CPU 111 issues a busy signal to the printer controller 12 when a job such as a print job or a firmware rewriting job is being executed, and a ready signal to the print controller 12 when a job may be executed.

The control module 120 is composed of a CPU 121, a flash ROM 122, an S-RAM 123 that provides a work area, an NV-RAM 124 that saves various setting values, serial I/Fs 125 and 126, and a print driver unit 127.

The serial I/F 125 and the serial I/F 126 are interfaces for transmitting and receiving control commands and the like to and from the control module 110 and the control module 140 respectively.

The print driver unit 127 is a drive control circuit for controlling driving of members related to image forming operation such as the photosensitive drum 182.

The CPU 121 instructs image forming operations to the print driver unit 127, and performs overall control of printing processing.

The flash ROM 122 a non-volatile memory the same as the flash ROM 112, and stores firmware for the operations of the CPU 121.

The control module 130 is composed of a CPU 131, a flash ROM 132, an S-RAM 133 that provides a work area, an NV-RAM 134 that stores various setting values, a serial I/F 135, and IR driver unit 136, an image processing ASIC 137, and an image input unit 138.

The serial I/F 135 is an interface for transmitting and receiving control commands and the like to and from the control module 110.

The IR driver unit 136 is a drive control circuit that controls driving of members such as the scanner 162 in the IR unit 160 that relate to operations for reading documents.

The CPU 131 instructs scan operations and the like of the scanner 162 to the IR driving unit 136, and performs overall control of processing for reading document images.

The flash ROM 132 is a non-volatile memory the same as the flash ROM 121, and stores firmware for the operations of the CPU 131.

The image input unit 138 drives the CCD sensor 163 in the IR unit 160 and outputs image data of a document that has been photoelectrically converted to the image processing ASIC 137.

The image processing ASIC 137 performs various types of commonly-known image processing such as shading correction, MTF correction, density correction, error diffusion and binarization on image data from the image input unit 138, and outputs the resulting image data to the control module 140 in the case of a copy job, and to the control module 110 in the case of an image information transmission job.

The control module 140 is composed of a CPU 141, a flash ROM 142, an S-RAM 143 that provides a work area, an NV-RAM 144 that saves various setting values, a serial I/F 145, an image quality correction control unit 146, and an image output unit 147.

The image quality correction control unit 146 performs image quality correction processing such as smoothing and intermediate gray scale reproduction on image data from the control modules 110 and 130, and outputs the resulting image data to the image output unit 147.

The image output unit 147 drives members such as the printer head 181 based on the image data from the image correction control unit 146, and performs exposure scanning of the photo sensitive drum 182.

The CPU 141 instructs image quality correction processing and the like to the image quality correction control unit 146 and so on, and performs overall control of image correction and output processing of corrected image data.

The flash ROM 142 is a non-volatile memory the same as the flash ROM 121, and stores firmware for the operations of the CPU 141.

The serial I/F 145 is an interface for transmitting and receiving control commands and the like to and from the control module 120.

1-3-3 Structure of the Printer Controller 12

Figure 5:
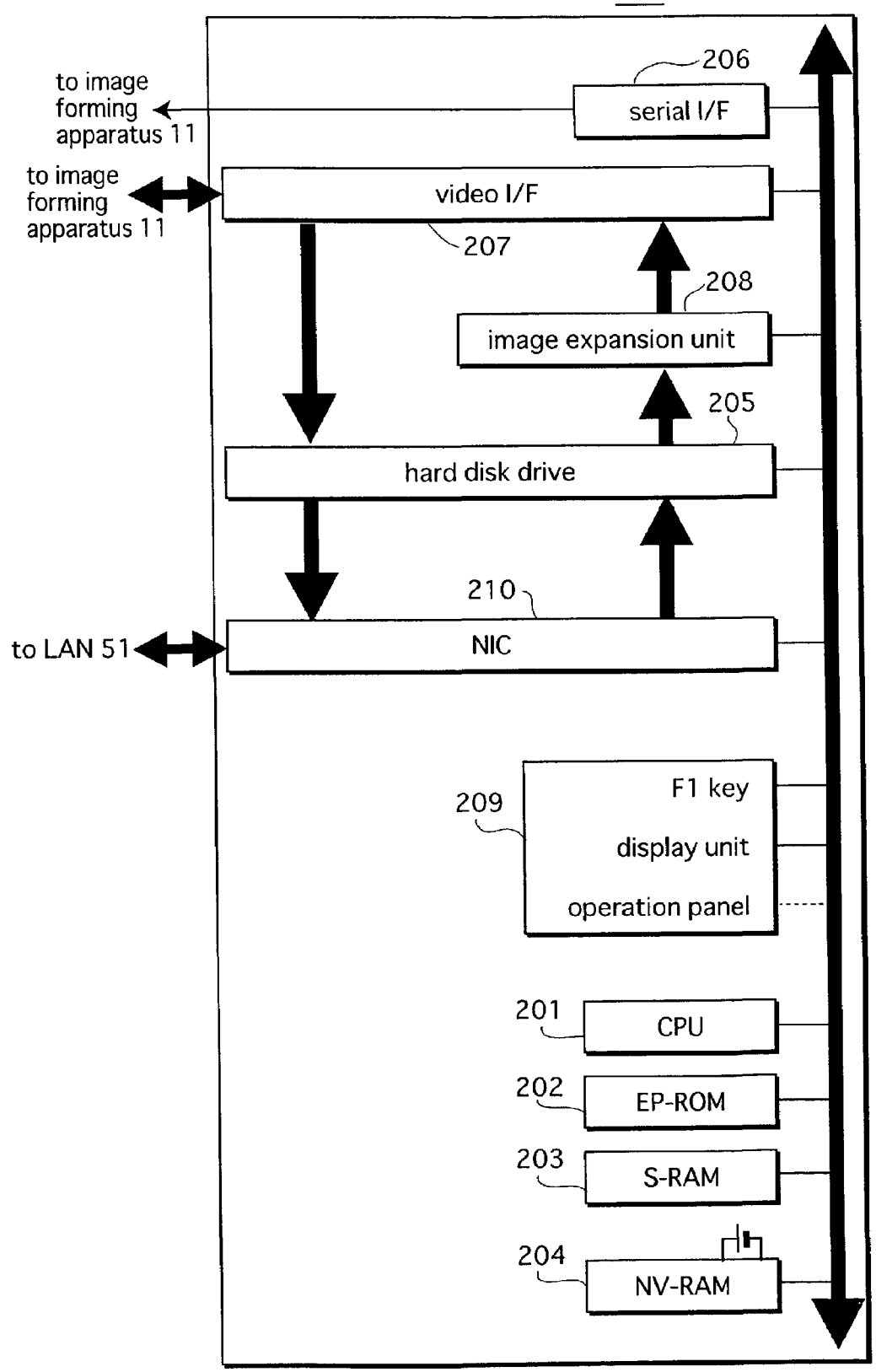
FIG. 5 is a block drawing showing the circuit structure of a printer controller.

FIG. 5 is a block drawing showing the circuit structure of the printer controller 12.

As the figure shows, the printer controller 12 is composed of a CPU 201, an EP-ROM (Erasable Programmable Read Only Memory) 202, an S-RAM 203 that provides a work area, and NV-RAM 204, a hard disk drive 205, a serial I/F 206, a video I/F 207, an image expansion unit 208, an operation panel 209 and an NIC 210.

The CPU 201 receives print jobs from the client terminal 31, manages the execution order of print jobs and firmware rewriting jobs in the image forming apparatus 11, controls transmission and reception of e-mail, manages firmware extracted from received e-mail, and controls image processing of images to be printed. Furthermore, as is described later, when print jobs and firmware rewriting jobs are in a wait state, the CPU 201 performs processing to find the total expected processing time and transmit information about the value of the expected processing time to the client terminal.

The EP-ROM 202 is a non-volatile memory, and stores control programs for the operations of the CPU 201.

The NIC 210 receives print jobs from the client terminal 31 etc. via the LAN 51.

The hard disk drive 205 is a non-volatile memory that stores print jobs received by the NIC 210, firmware extracted from e-mail, and e-mail received from the image forming apparatus 11 according to execution of an image information transmission job, and so on. Each print job is sent to the image expansion unit 208 by the CPU 201 when it is time for the particular print job to be executed. Firmware is sent to the imaging forming apparatus 11 via the serial I/F 206, without passing through the image expansion unit 208. E-mail having an image information transmission job attached thereto is transmitted to the specified destination via the NIC 210.

The image expansion unit 208 expands print data written in page description language that is included in a received print job to bit map data (image data), and transmits the image data to the image forming apparatus 11 via the video I/F 207.

The serial I/F 206 is connected to the serial I/F 117 in the image forming apparatus 11, and is an interface for transmission and reception of control commands and transmission of firmware to and from the control module 110.

The video I/F 207 is connected to the video I/F 118 in the image forming apparatus 11, and is an interface for transmitting and receiving image data and the like to and from the control module 110.

The operation panel 209 includes an F1 key (described later) for performing communication settings, and a display unit for displaying content that has been set.

The NV-RAM 204 stores various setting values and a job management table 211 (see FIG. 12), and so on. In addition to the mail address of the image processing apparatus 1, the NV-RAM 204 also stores the address of the mail server 43, which is necessary for downloading e-mail for the printer controller 12 from the server 43, and the mail addresses of other image processing apparatuses 2 etc.

In this structure, the control modules 110 to 140 usually transmit and receive control commands and the like between the respective CPUs via the serial I/Fs. However, when there is a firmware rewriting job execution command from the printer controller 12, the firmware data is transmitted and received via the I/Fs. The reason that firmware, which is large in size, is transferred using serial I/Fs that are capable of transferring only a small amount of data each unit of time is that providing transmission lines that are used specifically for firmware rewriting is provided on the control circuit board is extremely costly. Therefore, in reality such lines cannot be provided. Consequently, much time is required to transfer the large amount of data of the firmware.

Note that the flash ROM 112 that stores firmware is provided in a position close to the CPU 111. This is so that programs can be loaded to the CPU 111 quickly when the power is turned, and also to reduce noise during loading. This is the same for the respective CPUs and flash ROMs of the other control modules 120 to 140.

On the other hand, the communication lines used for image data when the image processing apparatus 1 executes a print job from the client terminal 31 etc. are high-speed. Specifically, the NIC 210, the image expansion unit 208, the video I/F 207, the video I/F 118 in the control module 110, the image quality correction unit 146, and the image output unit 147 in the control module 140, are connected by a high-speed data bus for fast transfer of image data. This is the same for the communication lines between the image input unit 138 and the image processing ASIC 137 in the control module 130, and the image quality correction control unit 146.

Note that in the present embodiment the image forming apparatus 11 is unable to receive selection input of copy jobs and image information transmission jobs while executing a job. Therefore, it is not necessary for the printer controller 12 to manage the execution order of such jobs, and the printer controller 12 does not register such jobs in the job management table 211.

1-4 Structure of the Apparatus at the Service Center 9

Figure 6:
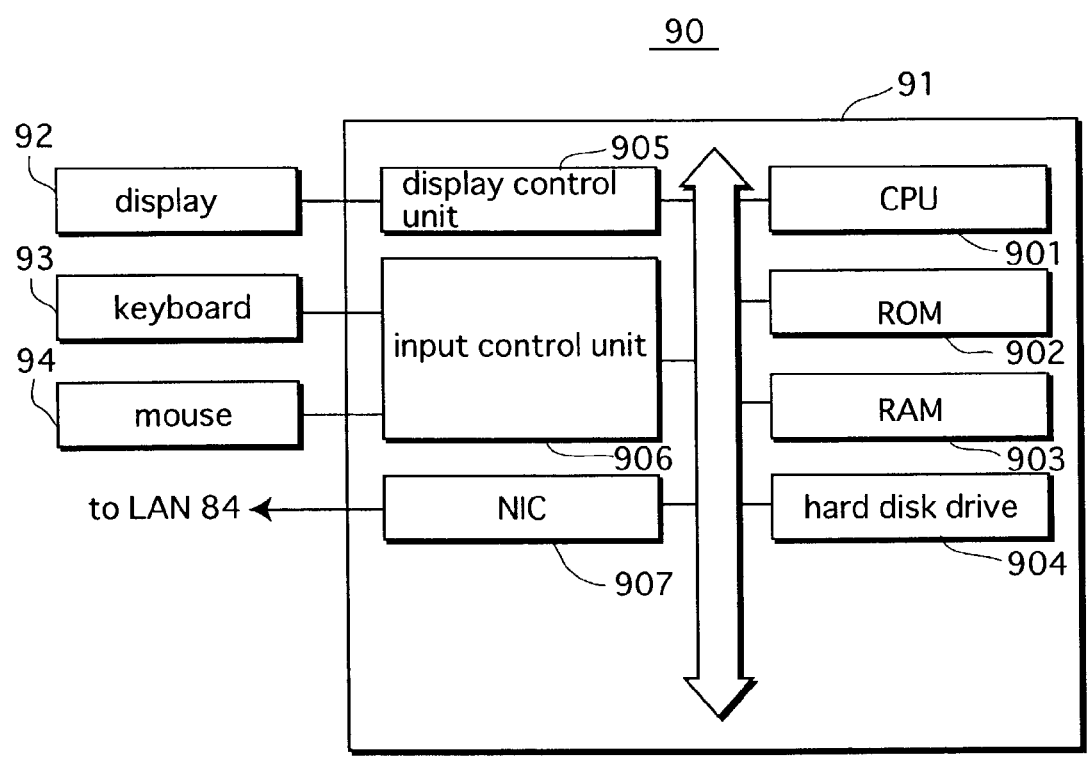
FIG. 6 is a block drawing showing the circuit structure of a PC provided at a service center.

FIG. 6 is a block drawing showing the circuit structure of the PC 90 that is provided at the service center 9.

As the figure shows, the PC 90 is composed of a computer unit 91, a display 92, a keyboard 93 and a mouse 94.

The computer unit 91 is composed of a CPU 901, a ROM 902, a RAM 903 that provides a work area, a hard disk drive 904, a display control unit 905 that controls display on a display 92, an input control unit 906 that receives input of signals from a keyboard 93 and a mouse 94, and an NIC 907 for transmitting firmware to the image processing apparatuses 1 etc. via the LAN 84.

The hard disk drive 904 is a non-volatile memory, and stores various information including the model name and e-mail address of each image processing apparatus 1, 2, etc., and firmware for each image processing apparatus. The firmware for each for each module in each model is stored in a separate folder (directory).

The CPU 901 manages firmware, controls transmission and reception of firmware, and executes processing for appending firmware to e-mail and transmitting the mail to the image processing apparatuses 1, 2 etc.

The ROM 902 stores a control program for the CPU 901 to perform processing for transmitting firmware.

The keyboard 93 has F1 to F3 keys for performing setting and registration of communication settings and the like which are described later.

1-5 Content of Processing by the PC 90 at the Service Center 9

Figure 7:
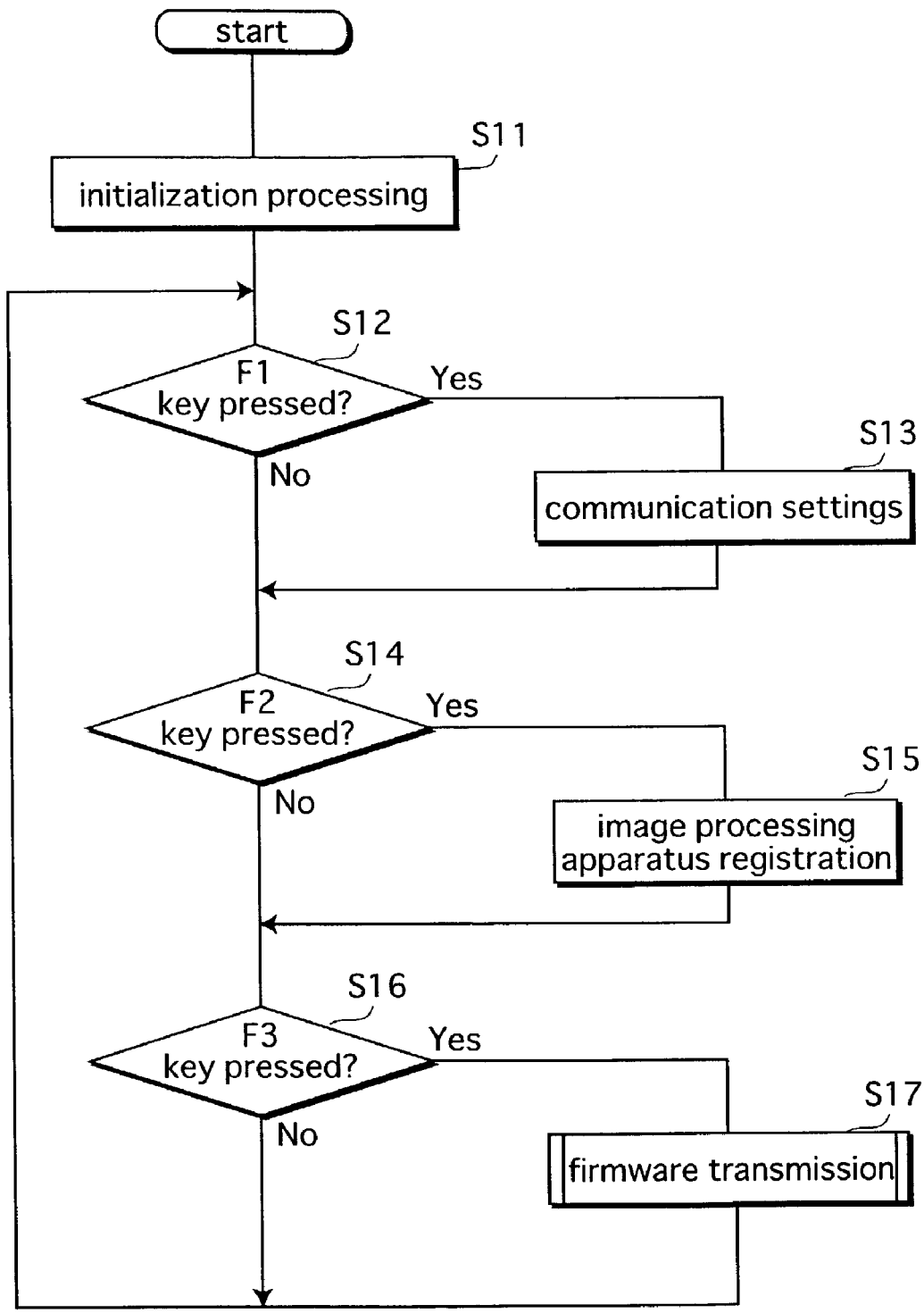
FIG. 7 is a flowchart showing the contents of processing executed by the CPU of the PC.

FIG. 7 is a flowchart showing the content of processing executed by the CPU 901 of the PC 90.

As the flowchart shows, when the power of the PC 90 is turned on the CPU 901 performs initialization processing of the than the RAM 903 and the other internal memories and of various parameters (step S11).

Next, the CPU 901 performs the following processing in response to operations of the F1 to F3 keys.

Specifically, on judging that the F1 key has been pressed (step S12, Yes), the CPU 901 performs communication settings (step S13).

Communication settings denote settings for transmitting e-mail. Specifically, when the F1 key is pressed, the CPU 901 has an input screen for communication settings displayed on the display 92. When an administrator inputs the mail addresses of the PC 90 and the mail server 83, the CPU 901 stores the input information in the hard disk drive 904. When the communication settings are complete, the CPU 901 proceeds to step S14.

On judging that the F2 key has been pressed (step S14, Yes), the CPU 901 performs processing to register an image processing apparatus (step S15).

Specifically, when the F2 key is pressed, the CPU 901 has an input screen for registration of image processing apparatus displayed, has the administrator input information such as the model name and e-mail address of the image processing apparatus to which firmware is to be transmitted, and the name, address and telephone number of the user of the image processing apparatus, and stores the input information in a registration information table 96 in the hard disk drive 904.

FIG. 8 shows one example of the content of the registration information table 96.

As the figure shows, information columns for model name-mail address of the apparatus and so on are provided in the registration information table 96, and the input information is stored in correspondence therein. When transmitting firmware, the CPU 901 refers to the registration information table 96 to obtain the mail address of the image processing apparatus to which the firmware is to be transmitted.

Returning to FIG. 7, when the registration processing at step S15 is complete, the CPU 901 proceeds to step S16.

On judging that the F3 key has been pressed (step S16, Yes), the CPU 901 performs firmware transmission processing (step S17), and then returns to step S12.

Figure 9:
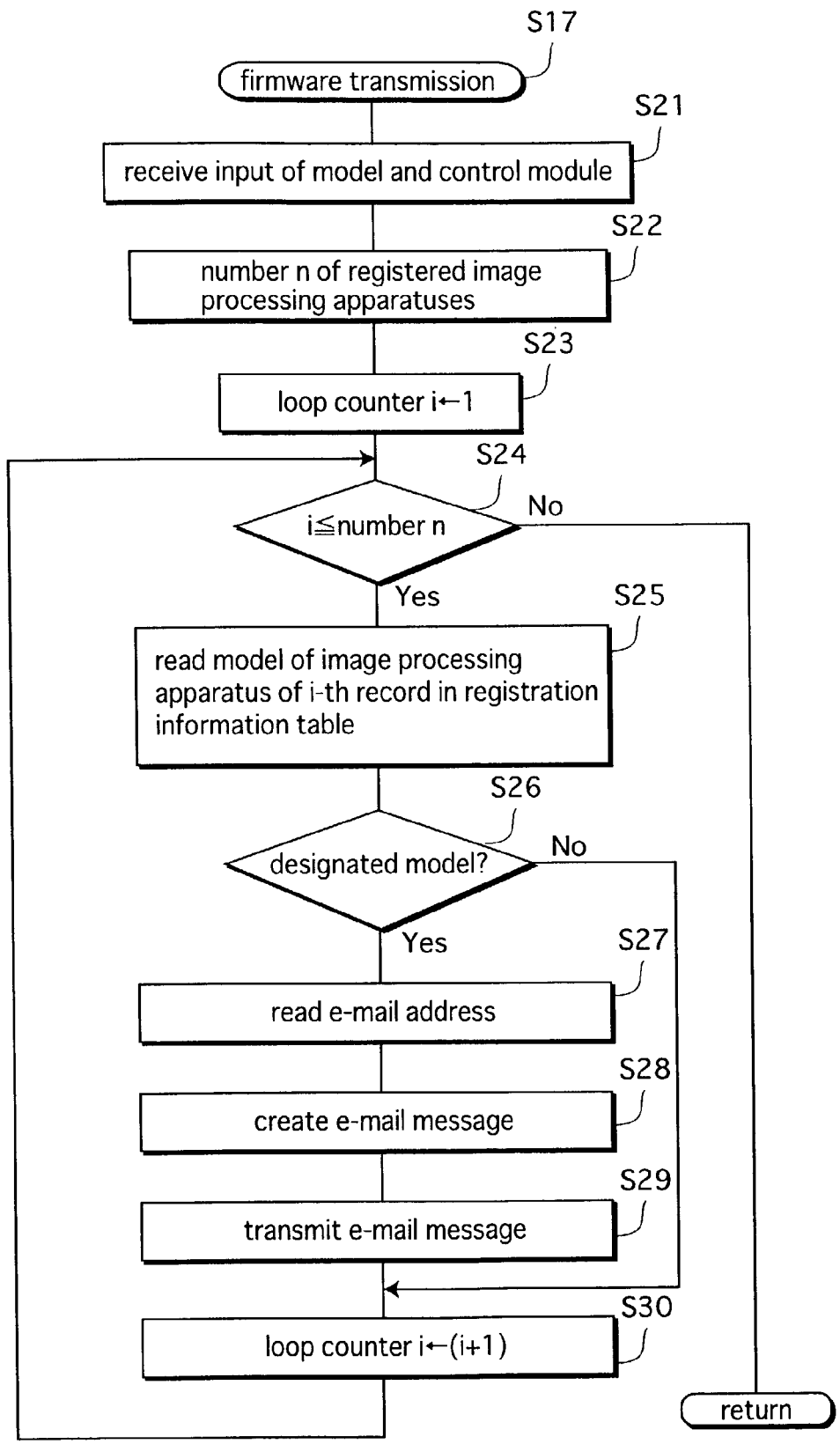
FIG. 9 is a flowchart showing the contents of a firmware transmission processing sub-routine.

FIG. 9 is a flowchart showing the contents of a firmware transmission processing sub-routine.

As the figure shows, the CPU 901 has an input screen for inputting the model name to which the firmware is to be transmitted and the number of the control module whose firmware is to be rewritten displayed on the display 92, and receives an input of the model name and module number from the administrator (step S21).

Next, the CPU 901 calculates a total number n of image processing apparatuses that are registered in the registration information table 96 (step S22), and sets a loop counter i to 1 (step S23).

Next, at step S24 the CPU 901 compares the value of i with the number n. Here, since i is considered to equal 1, the CPU 901 judges that i is equal to or less than n (step S24, Yes), and reads the model name in the i-th, here the first, registered record in the registration information table 96 (step S25). When the read model name is the same as the model name input at step S21 (step S26, Yes), the CPU 901 reads the mail address of that image processing apparatus from the registration information table 96 (step S27). Next, the CPU 901 specifies the firmware to be transmitted, based on the model name and module number input at step S21, designates the directory in the hard disk drive 904 in which the specified firmware is stored, reads the firmware from the directory, and creates e-mail to which it attaches the firmware. The destination of the mail is the read e-mail address (step S28).

Figure 10:
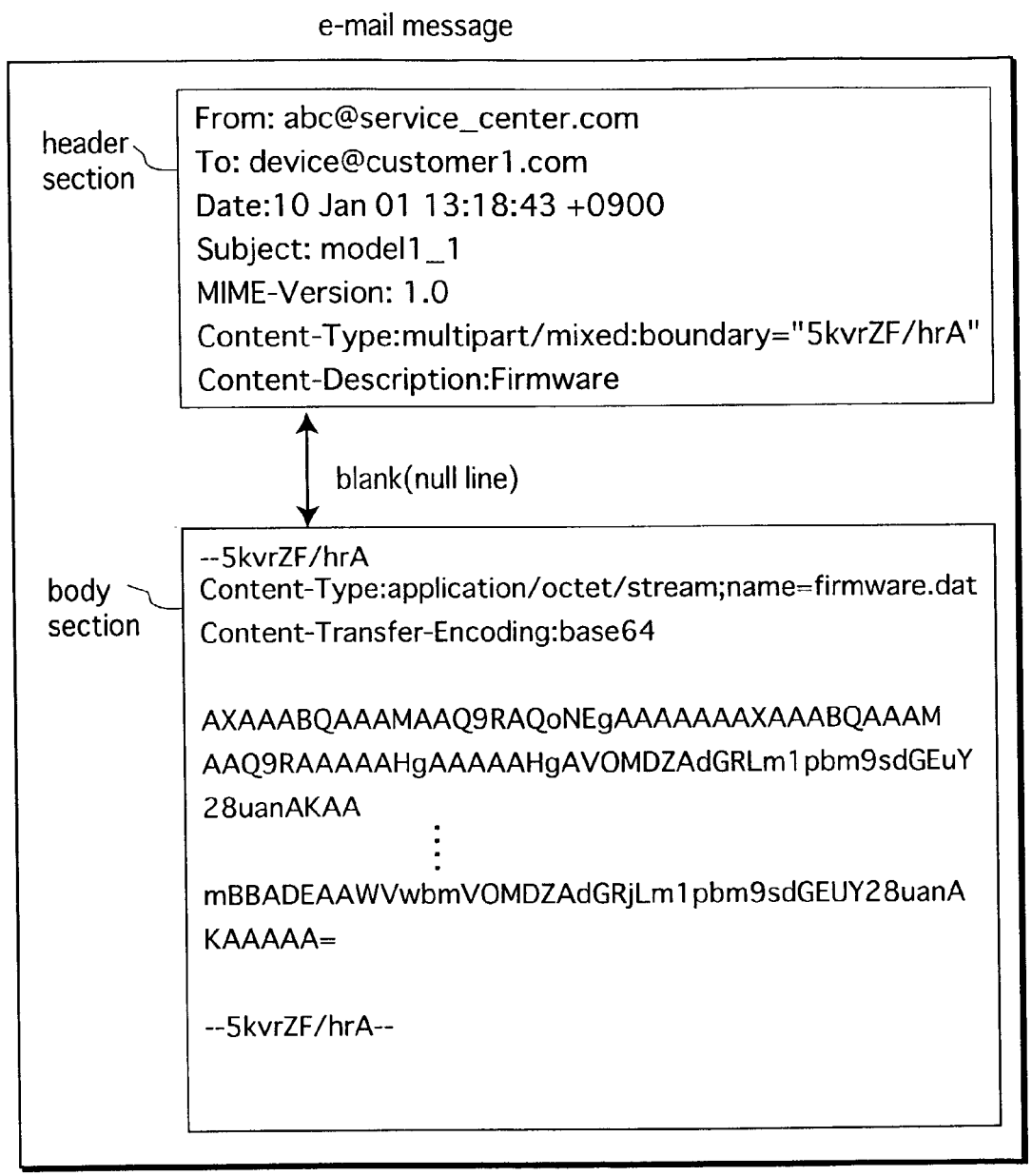
FIG. 10 is a schematic drawing showing an example of the contents of a message of created e-mail.

FIG. 10 is a schematic drawing showing an example of the contents of a message of created e-mail.

As the figure shows, the message is divided into a header section and a body section, in compliance with IETF (Internet Engineering Task Force) standard for e-mail messages RFC (Request for Comments). Information such as the destination is written in the header section, and firmware is written in the body section.

The Subject field lists a character string (here model1_1) in which the model name and the control module that were input by the administrator showing which firmware is to be sent are connected by an under bar.

The Content-Description field lists "Firmware". This shows that firmware is attached to the mail.

Note that since it is prohibited in RFC to list binary data in the message directly, the CPU 901 converts the firmware, which is originally binary data, to US-ASCII according to the commonly known base 64 method. The resulting US-ASCII is written below a Content-Transfer-Encoding field that shows the method by which the binary data of the firmware has been converted.

Returning to FIG. 9, at step S29 the CPU 901 transmits the created e-mail. The CPU 901 connects to the mail server 83 using TCP/IP (Transmission Control Protocol/Internet Protocol), and transmits the mail to the mail server 83 according to SMTP. The mail that is transmitted to the mail server 83 is distributed via the Internet 50 to the destination read at step S27.

Note that when the model name read at step S25 and the model name read at step S21 are not the same (step S26, No), it is not necessary to transmit firmware, so the CPU 901 proceeds to step S30.

At step S30, the CPU 901 adds 1 to the current loop counter value, here i=1, and returns to step S24.

At step S24, the CPU 901 judges whether 2 is equal to or less than n, and if so, the CPU 901 performs the processing from steps S25 to S30 for the apparatus registered second in the registration information table 96.

The CPU 901 repeats the processing from steps S25 to S30, successively transmitting e-mail until i is no longer equal to or less than n at step S24. Then, on judging that i is no longer equal to or less than n (step S24, No), the CPU 901 returns to the main routine. In this way, the firmware of the designated module number is transmitted to all the image processing apparatuses registered in the registration information table 96 having the same model name.

1-6 Contents of Processing by the Printer Controller 12

Figure 11:
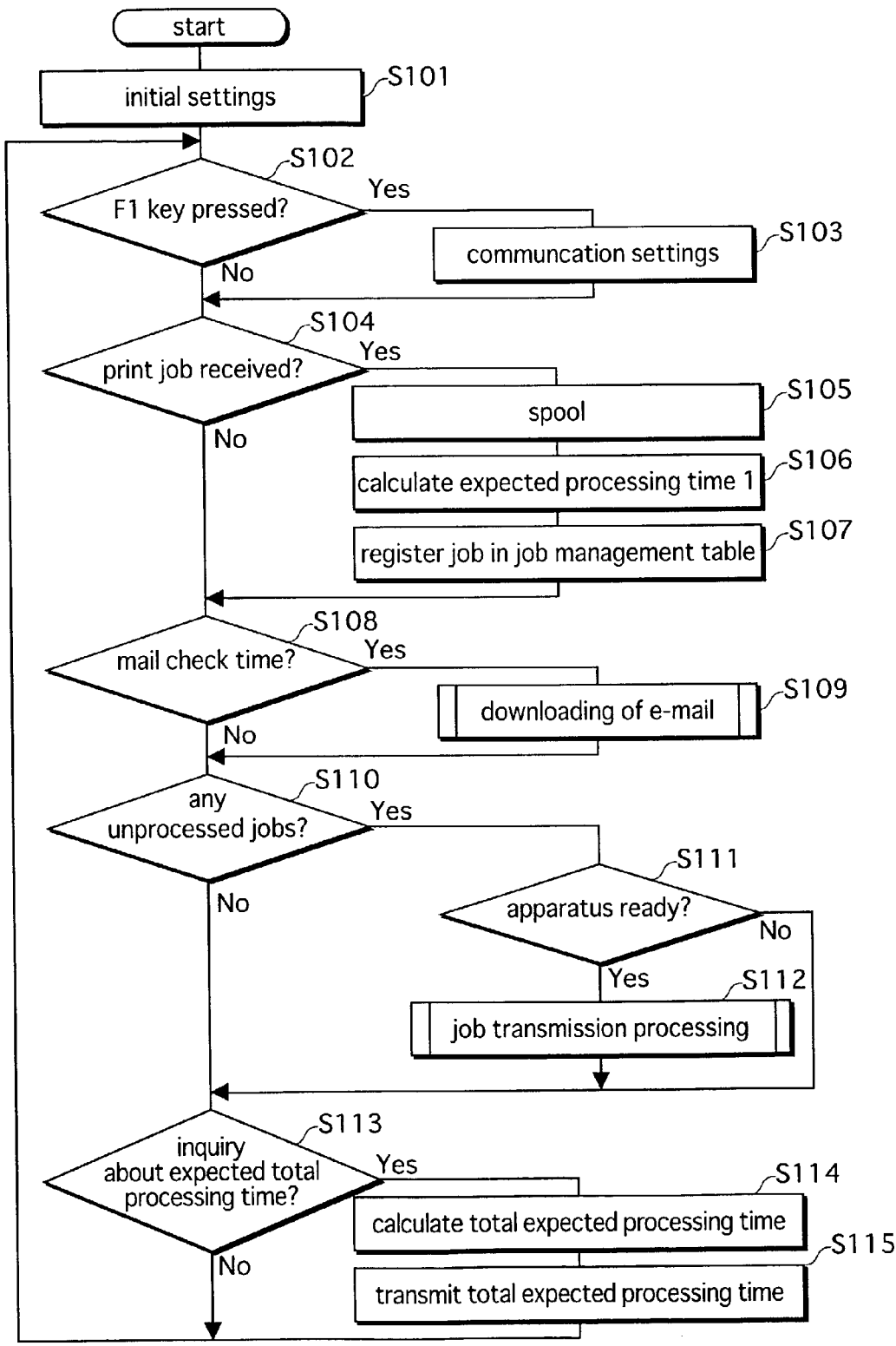
FIG. 11 is a flowchart showing the contents of processing executed by the CPU of a printer controller.

FIG. 11 is a flowchart showing the content of processing executed by the CPU 201 of the printer controller 12.

As the figure shows, when the power is turned on, first the CPU 201 performs initialization processing of the S-RAM 203 and the other internal memories, and of various parameters (step Then, the CPU 201 judges whether the F1 key on the operation panel 209 has been pressed. On judging that the F1 key has not been pressed (step S102, No), the CPU 201 proceeds to step S104. On the other hand, on judging that the F1 has been pressed (step S102, Yes), the CPU 201 performs communication settings for receiving and transmitting e-mail (step S103). Here, the CPU 201 has an input screen for communication settings displayed on the display unit of the operation panel 209. When the user inputs information such as the mail address of the mail server 43 and the image processing apparatuses 1, 2 etc., and a time interval (hereinafter "interval T") at which to check whether new e-mail has arrived for the image processing apparatus 1, the CPU 201 stores the input information in the NV-RAM 204. When the communication settings are complete, the CPU 201 proceeds to step S104.

At step S104, the CPU 201 judges whether a print job has been received from any of the client terminals 31, 32, etc. On judging that a print job has not been received (step S104, No), the CPU 201 proceeds to step S108. On the other hand, on judging that a print job has been received (step S104, Yes), the CPU 201 spools the data, here the data is stored temporarily in the hard disk drive 205 (step S105), and calculates the time required to execute the print job from start to finish (hereinafter "expected processing time 1") (step S106).

Here, expected processing time 1 is found by the following Expression 1.

$$\text{Expected processing time 1} = (\text{print data size}) * (\text{processing time per unit of size}) \qquad (\text{Expression 1})$$

"Print data size" is the size of the print data. "Processing time per unit of size" is a value that is a processing time, found by experiments, that is actually required to perform print processing based on a predetermined size of print data, divided by the predetermined size. The processing time for one unit of size is pre-stored in the EP-ROM 202, and read when calculating the expected processing time 1.

Note that the expected processing time 1 may be found by other methods instead of the above-described method. For example, the amount of time required to print out one page may be found in advance, and the number of pages to be printed out in the print job multiplied by this amount of time. Furthermore, since the amount of time required to print out varies depending on whether the image is to be rotated, reduced or enlarged, or the image resolution converted, the processing time can be found more accurately if the expected processing time 1 is found based on the content of the processing to be executed.

At step S107 the CPU 201 refers to the job control information and the like that show the content of the print job, and performs processing to register the print job in the job management table 211.

FIG. 12 shows an example of the contents of the job management table 211.

As the figure shows, columns are provided in the job management table 211 for job number, job type, supplementary information, memory address, client name, and expected processing time. Each time a new job is received, the CPU 201 adds a record showing the contents of the new job below the record that is currently on the bottom row of the table. Consequently, the job numbers show the order in which the jobs were received.

Information showing the type of the job is written in the job type column. Specifically, at step S132 (described later), when a print job is received from one of the client terminals 31, 32, etc., "print job" is written in the job type column, and when firmware is received from the service center 9, "firmware rewriting job" is written in the job type column.

For print jobs, information such as the name of the transmitter of the job, the size to be printed on, and so on that are included in the job control information and the page control information are written in the supplementary information column (in the drawing an identification number of the client terminal that transmitted the job is shown). For firmware rewriting jobs, the name of the model and the number of the module to be updated are written.

The storage address in the hard disk drive 205 of the received print job or firmware is written in the memory address column. The IP address of the client terminal that transmitted the print job is written in the client column.

In the case of a print job, the value of the expected processing time 1 found at step S106 is written in the expected processing time column. In the case of a firmware rewriting job, the time expected to be required for executing the firmware rewriting job from start to finish (expected processing time 2) which is found at step S131 (described later) is written in the expected processing time column.

The job management table 211 is used for managing the execution order of jobs. The CPU 201 instructs execution of the jobs to the image forming apparatus 11 in order starting from that having the lowest job number, and then deletes the particular job from the job management table 211. Consequently, jobs that have not yet been executed, in other words unprocessed jobs that are place in a wait state, remain in the job management table 211.

Returning to FIG. 11, at step S108 the CPU 201 judges whether it is time to check whether new e-mail has arrived. Here, the CPU 201 checks for e-mail by communicating with the mail server 43 at the interval T set in the communication settings at step S103. The CPU 201 judges whether it is time to check for e-mail by judging whether the interval T has passed since last checking for e-mail.

When the CPU 201 judges that it is not time to check (step S108, No), it proceeds to step S110. On the other hand, when it judges that it is time to check (step S108, yes), the CPU 201 executes e-mail downloading processing (step S109). In this processing, as described later, when firmware is attached to downloaded e-mail, the CPU 201 calculates the expected processing time 2 of the firmware, and registers that time and the firmware rewriting job in correspondence in the job management table 211.

At step S110, the CPU 201 judges whether there are any unprocessed jobs, in other words whether there are any jobs registered in the job management table 211.

On judging that there are unprocessed jobs (step S110, Yes), the CPU 201 then judges whether the image forming apparatus 11 is in a ready state (in other words, whether it is not currently executing a job, and is in a state in which it can execute a job). The CPU 201 makes this judgement according to whether a ready signal or a busy signal is being sent from the CPU 111. On judging that a ready signal is being sent, in other words that the image forming apparatus 11 is in a ready state (step S111, Yes), the CPU 201 performs job transmission processing (step S112). This job transmission processing, as is described later, is processing for instructing the image forming apparatus 11 to execute the job that is registered at the top of the job management table 211.

On the other hand, when there are no unprocessed jobs, in other words on judging that there are no jobs registered in the job management table 211 (step S110, No), the CPU 201 proceeds to step S113. Furthermore, at step S111, when the image forming apparatus 11 is not in a ready state, in other words when the CPU 201 judges that it is receiving a busy signal, the CPU 201 proceeds to step S113. Note that in this case the CPU 201 goes through the whole routine, and on judging at step S111 that the image forming apparatus 11 is in a ready state, the CPU 201 performs the job transmission processing at step S112.

At step S113, the CPU 201 judges whether there is an inquiry from one of the client terminals about the total expected processing time. Here, the total expected processing time is the time expected to be required when all unprocessed print jobs and firmware rewriting jobs that are in a wait state as described above are successively executed. On judging that there has been an inquiry (step S113, Yes), the CPU 201 calculates the total expected processing time (step S114). This calculation is performed by totaling the time in the expected processing time column for each job registered in the job management table 211.

Next, the CPU 201 transmits information showing the calculated total expected processing time to the client terminal that made the inquiry (step S115), and returns to step S102.

Note that when the CPU 201 judges that there is no inquiry about the total expected processing time (step S113, No), it returns to step S102.

The following describes the contents of an e-mail downloading processing sub-routine at step S109 and a job transmission processing sub-routine at step S112.

Figure 13:
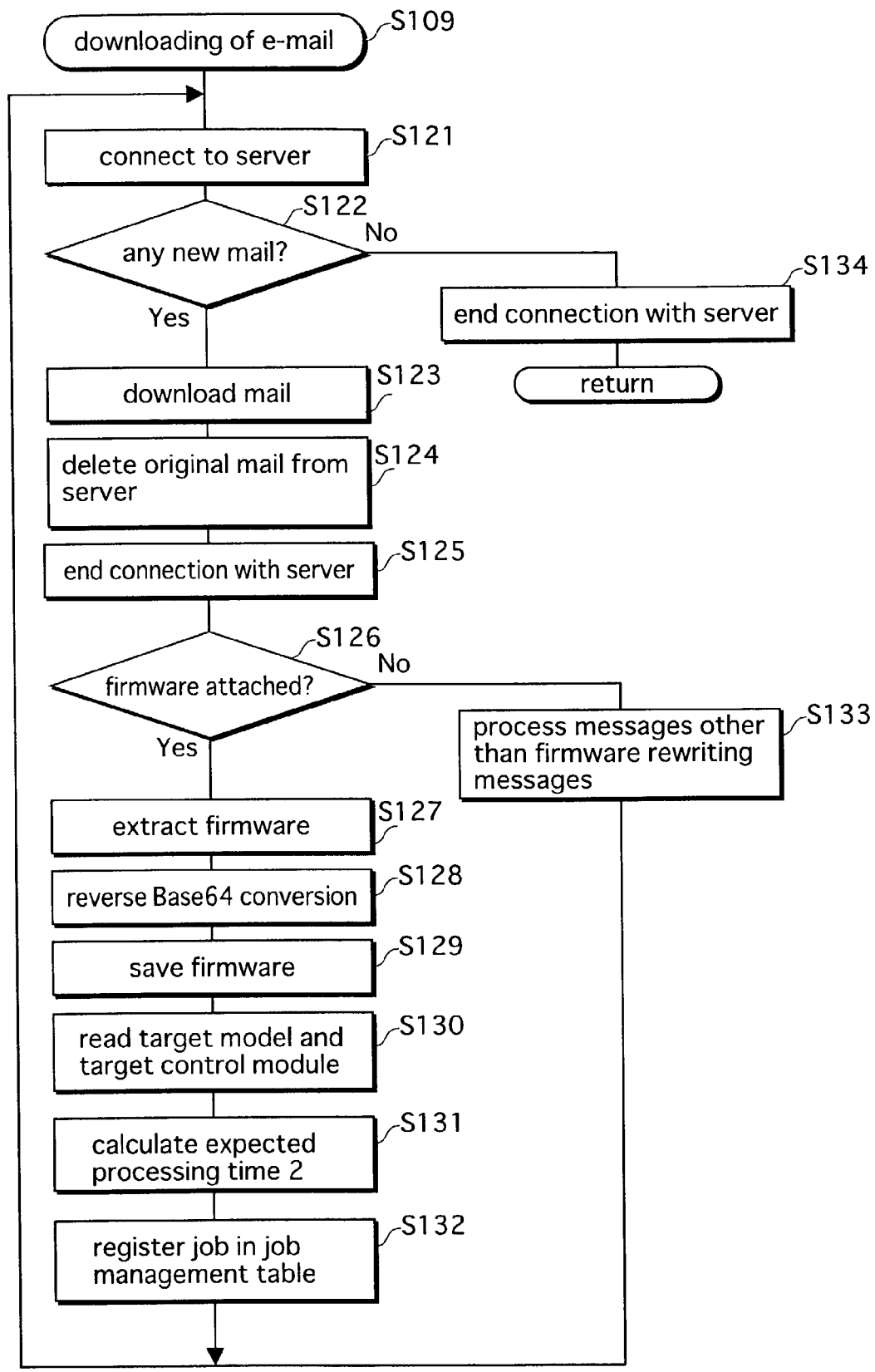
FIG. 13 is a flowchart showing the contents of an e-mail downloading sub-routine.

FIG. 13 is a flowchart showing the contents of the mail downloading processing sub-routine.

As the figure shows, the CPU 201 connects to the mail server 43 using TCP/IP protocol (step S121), and after confirming that new e-mail has arrived (step S122, Yes), downloads the mail (step S123). POP 3 (Post Office Protocol 3) is used in the downloading processing. Note that when a plurality of e-mails have arrived, the CPU 201 downloads only one.

Next, the CPU performs processing to delete the downloaded e-mail from the mail server 43 (step S124), and ends the connection with the mail server 43 (step S125).

The CPU 201 judges whether new firmware for rewriting is attached to the downloaded e-mail (step S126). The CPU 201 makes this judgement according to whether there is a Content-Description field in the header section and whether "Firmware" is listed in the Content-Description field.

When the CPU 201 judges that firmware is attached (step S126, Yes), it extracts the US-ASCII character string in the body section that corresponds to the firmware that has been converted according to the base64 method (step S127), and converts the character string back to binary data according to reverse base64 conversion (step S128). The CPU 201 then stores the resulting binary data in the hard disk drive 205 (step S129).

Next, the CPU 201 extracts the model name and the module number that are the target of rewriting, from the value of the Subject field in the header section of the message (step S130). Then, the CPU 201 calculates the expected processing time 2 (step S131). As described earlier, the expected processing time 2 is the time expected to be required to execute the firmware rewriting from start to finish. The expected processing time 2 is found using the following Expression 2.

Expected processing time 2=(firmware size)*(rewriting time per unit of size)+(initialization reference time) (Expression 2)

Here, "firmware size" denotes the size of the firmware.

"Rewriting time per unit of time" is a value that is a rewriting processing time, found by experiments, that is actually required to perform rewriting processing based on a predetermined size of print data, divided by the predetermined size. The rewriting time per unit of time is pre-stored in the EP-ROM 202, and read when calculating the expected processing time 2.

"Initialization reference time" is the time required after rewriting the firmware for the image processing apparatus 11 to perform initialization of various parameters of its internal memories (described later) and for the fixing unit 18 to reach the fixing temperature, so that the image processing apparatus 11 is in a state in which execution of print jobs and the like is possible (ready state). The reference time is found according to experiments, and pre-stored in the EP-ROM 202.

Next, the CPU 201 registers the content of the attached firmware in the job management table 211 (step S132). Specifically, as shown in FIG. 12, the CPU 201 writes "firmware rewriting job" in the job type column, writes a value showing the model name and module number that are the target of rewriting in the supplementary information column, writes the address in the hard disk drive 205 at which the firmware is stored in the memory address column, writes the transmission origin IP address shown in the From field in the client column, and writes the value of the expected processing time 2 found at step S131 in the expected processing time column. After completing registration of the job the CPU 201 returns to step S121.

Note that at step S126, on judging that firmware is not attached to the downloaded e-mail, the CPU 201 proceeds to step S133, executes processing for when e-mail for purposes other than firmware rewriting is received, and returns to step S121.

Next, at step S121 and S122, the CPU 201 performs processing to check whether new e-mail has arrived, and repeats the processing at steps S123 to S133 until it judges that there is no new e-mail (step S122, No). Then the CPU 201 ends the connection with the mail server 43 (step S134), and returns to the main routine.

Figure 14:
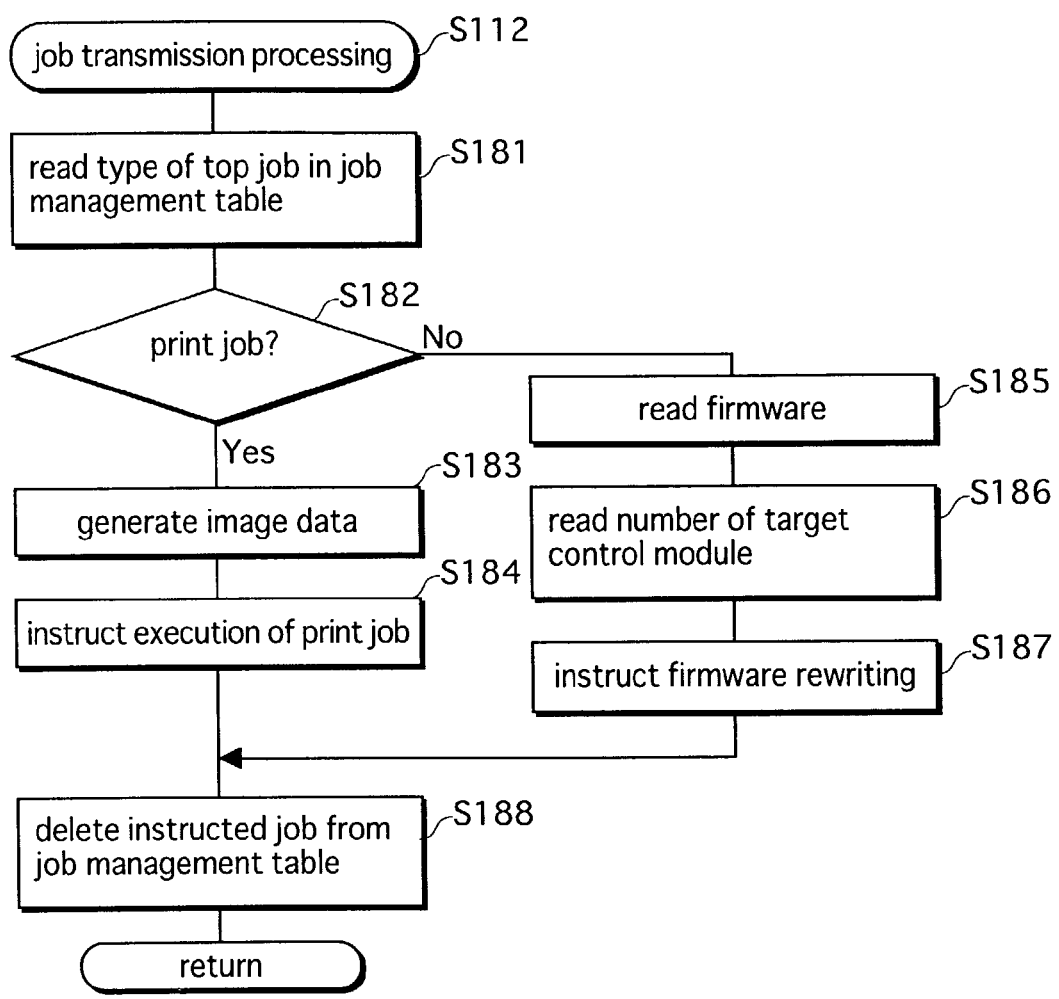
FIG. 14 is a flowchart showing the contents of a job transmission processing sub-routine.

FIG. 14 is a flowchart showing the contents of the job transmission processing sub-routine.

As the drawing shows, first the CPU 201 reads the type of the job at the top of the job management table 211 (job number 1) (step S181).

On judging that the type of the job is print job (step S182, Yes), the CPU 201 refers to the memory address column in the job management table 211, and reads the print job data from the address in the hard disk drive 205 shown in the memory address column. After having the print data expanded by the image expansion unit 208 to generate image data (step S183), the CPU 201 instructs the image forming apparatus 11 to execute the print job (step S184). Specifically, the CPU 201 reads content such as the number of copies to be made and the paper size included in the page control information and so on in the supplementary information, transmits this information together with the generated image data to the image forming apparatus 11, and has the image forming apparatus 11 execute the job.

On the other hand, on judging at step S181 that the read job is a firmware rewriting job (step S182, No), the CPU 201 refers to the memory address column of the job management table 211, and reads the firmware from the address in the hard disk drive 205 shown in the memory address column (step S185). Then, the CPU 201 reads the control module number that is the target of rewriting from the supplementary information column (step S186), and instructs execution of the firmware rewriting job (step S187). Specifically, the CPU 201 transmits the read firmware and information showing the read number of the control module whose firmware is to be rewritten to the image forming apparatus 11 via the serial I/F 206, and has the image forming apparatus 11 execute the rewriting job.

At step S188, the CPU 201 deletes the job whose execution was instructed from the job management table 211, and returns to the main routine.

Note that although not shown in the drawings, when e-mail for an image information transmission job is received from the image forming apparatus 11, the CPU 201 also has processing executed to distribute the mail to the designated destination.

1-7 Contents of Processing Performed by the Image Forming Apparatus 11

Figure 15:
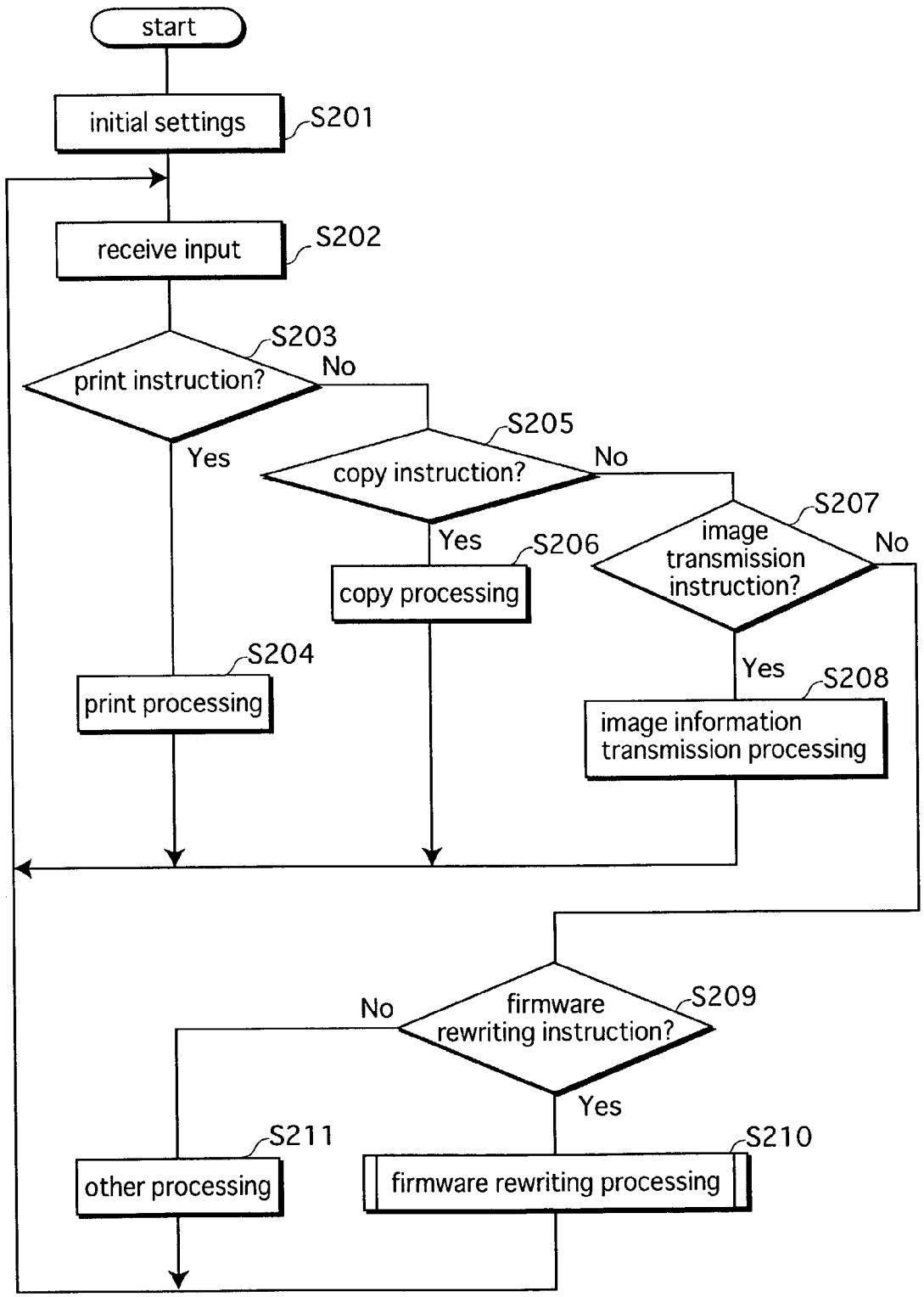
FIG. 15 is a flowchart showing the contents of processing executed by the CPU and other components of the image forming apparatus.

FIG. 15 is a flowchart showing the contents of processing executed by the CPU 111 and so on in the image forming apparatus 11.

As the figure shows, when the image forming apparatus 11 is turned on, the CPU 111 initializes the S-RAM 113 and other internal memories in the control module 110, and various parameters and so on. The CPU 111 also has the CPUs 121 to 141 of the control modules 120 to 140 execute the same kind of initialization processing, and has the fixing unit 185 heat up until it reaches the heating temperature. When the initialization and so on is complete, the image forming apparatus 11 is in a ready state in which print jobs and the like can be executed (step S201).

Next, the image forming apparatus 11 receives input of various types of signals (step S202). Here, the various types of signals include signals input according to key operations of the operation panel 119, and signals from the printer controller 12 showing execution of print jobs and firmware rewriting jobs. Note that input of copy jobs and image information transmission jobs are not received while print jobs and the like are being executed.

At step S203, the CPU 111 judges whether a print job execution instruction has been received from the printer controller 12.

On judging that a print job execution instruction has been received (step S203, Yes), the CPU 111 etc. execute print processing based on image data sent from the print controller 12 (step S204). The CPU 111 then returns to step S202.

On the other hand, on judging that a copy job execution instruction has been received according to a key operation on the operation panel (step S203, No; step S205, Yes), the CPU 111 etc. execute copy processing, in other words read the document image and execute printing processing based on the read image data (step S206). The CPU 111 etc. then return to step S202.

Furthermore, in input reception processing, on judging that execution of an image information transmission job has been instructed according to a key operation on the operation panel 119 (step S205, No; step S207, Yes), the CPU 111 etc. read an image of the document, create e-mail to which it attaches the image information of the read document, and execute processing to transmit the mail to the printer controller 12 (step S208). The CPU 111 etc. then return to step S202.

On the other hand, on judging that execution of a firmware rewriting job has been instructed by the printer controller 12 (step S207, No; step S209, Yes), the CPU 111 etc. execute firmware rewriting processing (step S210), and then return to step S202.

Figure 16:
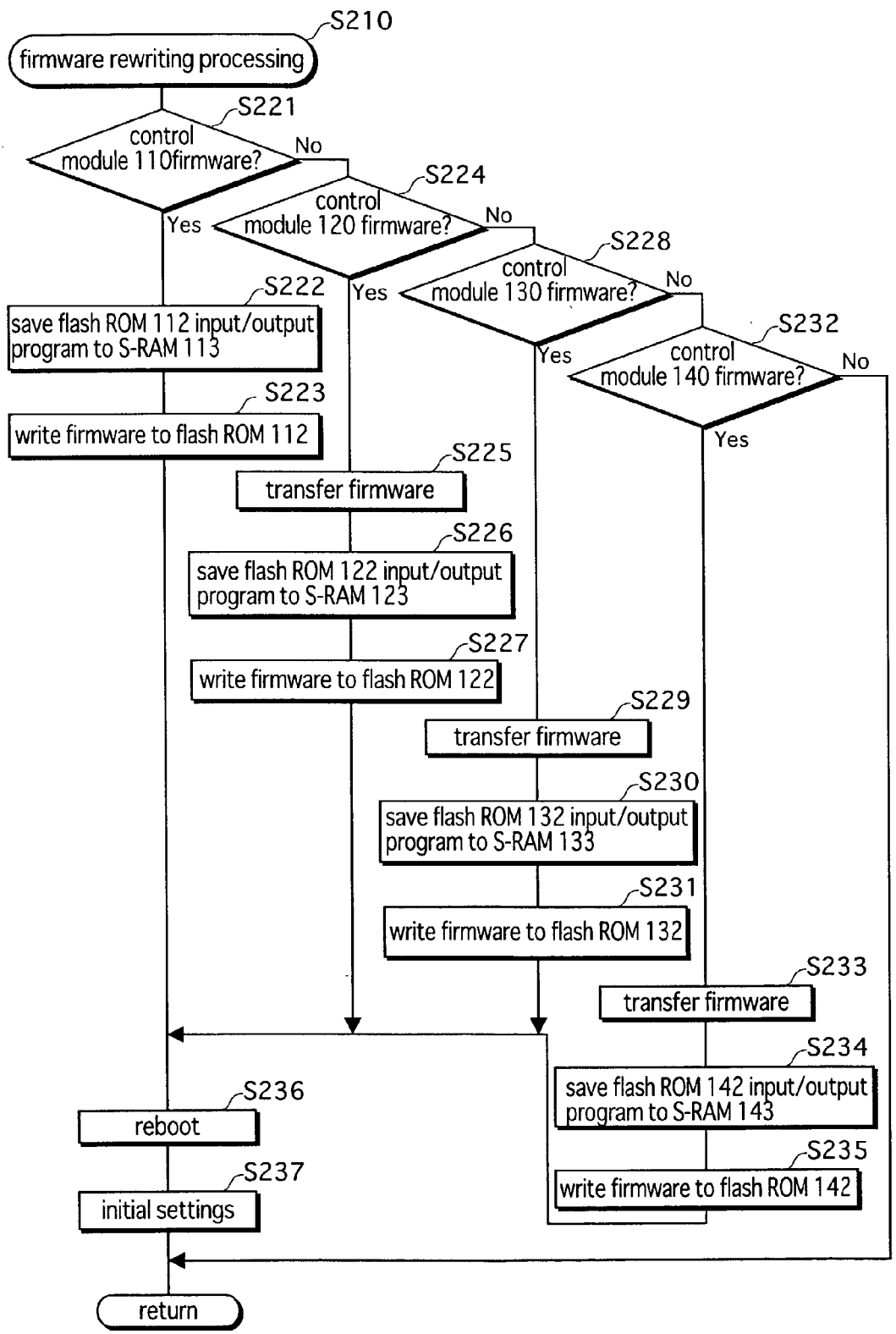
FIG. 16 is a flowchart showing the content of a firmware rewriting processing sub-routine.

FIG. 16 is a flow chart showing the contents of a firmware rewriting processing sub-routine.

As the figure shows, the CPU 111 judges, based on information showing a module number, which control number corresponds to the received firmware that is for rewriting, and has the firmware written to the flash ROM of the corresponding control module. In other words, on judging that the firmware corresponds to the control module 110 (step S221, Yes), the CPU 111 saves the input/output program which includes a firmware rewriting program and that is stored in the flash ROM 112 (hereinafter referred to simply as an "input/output program"), to the S-RAM 113 (step S222), and overwrites the firmware to the flash ROM 112, using the input/output program (step S223). Then, the image forming apparatus 11 executes rebooting in which it turns itself off and then on again (step S236), and after performing initialization settings (the same as at step S201) (step S237), returns to the main routine.

On the other hand, on judging that the received firmware corresponds to the control module 120 (step S221, No; step S224, Yes), the CPU 111 transfers the firmware to the control module 120 (step S225). The CPU 121 saves the input/output program that is stored in the flash ROM 122 to the S-RAM 123 (step S226), and overwrites the firmware to the flash ROM 122, using the input/output program (step S227). Then the image forming apparatus 11 proceeds to step S236.

On judging that the received firmware corresponds to the control module 130 (step S224, No; step S228, Yes), the CPU 111 transfers the firmware to the control module 130 (step S229). The CPU 131 saves the input/output program that is stored in the flash ROM 132 to the S-RAM 133 (step S230), and overwrites the firmware to the flash ROM 132, using the input/output program (step S231). Then the image forming apparatus 11 proceeds to step S236.

On judging that the received firmware corresponds to the control module 140 (step S228, No; step S232, Yes), the CPU 111 transfers the firmware to the control module 140 via the control module 130 (step S233). The CPU 141 saves the input/output program that is stored in the flash ROM 142 to the S-RAM 143 (step S234), and overwrites the firmware to the flash ROM 142, using the input/output program (step S235). Then the CPU 111 proceeds to step S236. Note that when the CPU 111 judges that the received firmware does not correspond to any of the control modules 110 to 140 (step S232, No), it returns to the main routine without rebooting.

Returning to FIG. 15, on judging at step S209 that execution of a firmware rewriting job has not been instructed, at step S211 the CPU 111 performs other processing, such as communication processing of various instructions between the modules, and returns to step S202.

1-8 Contents of Processing Performed by the Client Terminal 31

Figure 17:
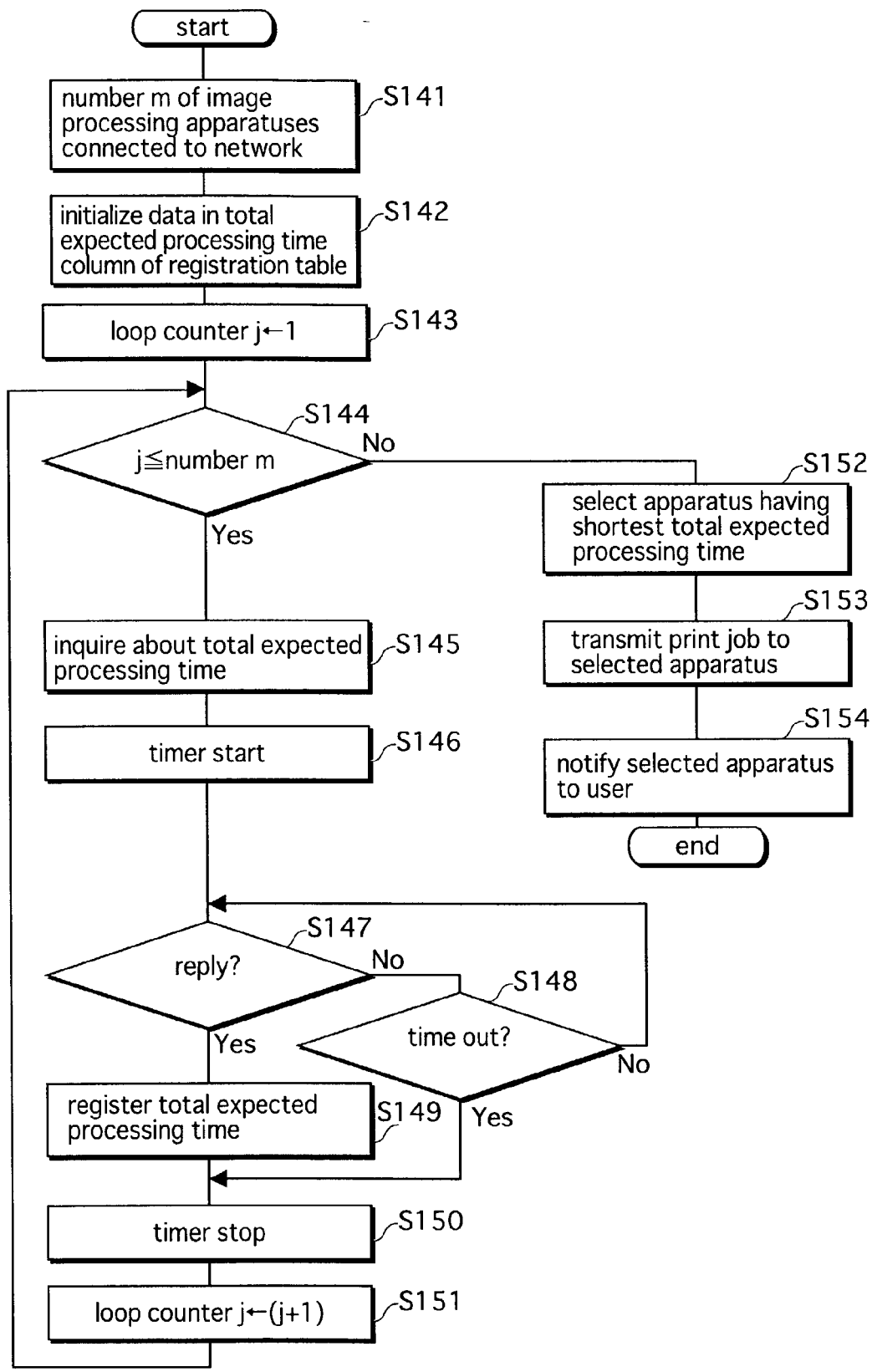
FIG. 17 is a flowchart showing the contents of processing executed by a CPU of the client terminal when transmitting a print job.

FIG. 17 is a flowchart showing contents of processing performed by the CPU 301 of the client terminal 31 each time the client terminal 31 transmits a print job to an image processing apparatus.

As the drawing shows, the CPU 301 calculates a total number m of image processing apparatuses 1, 2 etc. that are connected to the network, here the LAN 51 (step S141). This calculation is performed by referring to a registration information table 311 shown in FIG. 18. The registration information table 311 is stored in the hard disk drive 304, and, as the figure shows, is provided with a number column, a model type column, an ID address column, and a total expected processing time column.

The model name and IP address columns are registered in advance by the user for each image processing apparatus that is a possible destination. Each apparatus that is registered is added to the registration information table 311 below the lowest record in the table. Accordingly, the total number of image processing apparatuses m that are currently connected to the LAN 51 can easily be calculated by referring to the number column. Note that a total expected processing time for each image processing apparatus is written in the total expected processing time column at step S149 (described later).

At step S142 the CPU 311 performs initialization processing in which it writes "−1" in the total expected processing time column for each image processing apparatus registered in the registration information column 311.

Next, at step S143, the CPU 301 sets a loop counter j to 1, and compares the size of the value of j to the number m at step S144. Here, since j is considered to equal 1, the CPU 301 judges that j is equal to or less than m (step S144, Yes). Then, the CPU 311 inquires about the total expected processing time to the image processing apparatus of the j-th, here the first, registered record in the registration information table 311 (step S145). For example, when the image processing apparatus of the j-th record is the image processing apparatus 1, on receiving an inquiry from the client terminal 31 (FIG. 11, step S113, Yes), the printer controller 12 calculates the total expected processing time for the image processing apparatus 1 (step S114), and performs processing to transmit information showing the calculated time to the client terminal 31 (step S115)

After activating an internal timer simultaneously to making the inquiry (step S146), the CPU 301 of the client terminal 31 judges whether there is a response from the information processing apparatus (step S147). When there is no response (step S147, No), the CPU 301 judges whether a predetermined amount of time has passed since making the inquiry (whether it has timed out), and if the amount of time has not yet passed (step S148, No), the CPU 301 returns to step S147.

When there is a response from the image processing apparatus, in other words, when the client terminal 31 receives information showing the total expected processing time, the CPU 301 overwrites the total expected processing time column for the image processing apparatus with the received time (step S149), and proceeds to step S151. On the other hand, when there is no response even after the predetermined time has passed (step S148, Yes), the CPU 301 proceeds to step S150 without writing a total expected processing time. In this case the content of the total expected processing time for the image processing apparatus remains as "−1".

At step S150, the CPU 301 stops and then resets the timer. At step S151, the CPU 301 increments the current counter value, here j=1, by 1, and returns to step S144.

At step S144, the CPU 301 judges whether 2 is equal to or less than m, and if so, executes the processing from step S145 to S151 for the apparatus registered in the second record in the registration information table 311.

The CPU 301 repeats the processing from steps S145 to S151 until j is no longer less than or equal to m at step S144, successively registering the total expected processing time for each image processing apparatus. On judging that j is not equal to or less than m (step S144, No), the CPU 301 proceeds to step S152.

At step S152, the CPU 301 refers to the total expected processing time column in the registration information table 311 to select the apparatus whose total expected processing time is shortest (excluding that whose time is "−1") as the transmission destination of the print job. Then the CPU 301 transmits the print job to the selected image processing apparatus (step S153), notifies the user by having the name of the selected apparatus displayed on the display 320 (step S154), and ends the processing.

As has been described, the client terminal of the present embodiment inquires about the total expected processing time of each image processing apparatus before transmitting a print job. After receiving an inquiry from the client terminal, each image processing apparatus finds a total expected processing time of the time it expects to take if it were to successively execute all the print jobs and firmware rewriting jobs currently in a wait state in the image processing apparatus, and transmits the found time to the client terminal. Then, the client terminal refers to the total expected processing time from each image processing apparatus, and selects the image processing apparatus having the shortest time as the apparatus to transmit the print job to. In, this way, print jobs are automatically transmitted to the image processing apparatus that is expected to have the shortest wait-time. This has an effect of avoiding the problem in a conventional system where, because the user does not know the state of print jobs in the wait state, a print job is sent to the apparatus having the least number of print jobs in the wait state, but actually the user is made to wait a long time because of a firmware rewriting job. This allows the user to have their desired printed matter quickly. This effect can be obtained even when the jobs in a wait state are only firmware rewriting jobs, for example. In this case, (total expected processing time)=(expected processing time 2).

Note that the structure is not limited to being one in which the client terminal automatically selects the apparatus whose total expected processing time is the shortest. For example, the total expected processing time of each image processing apparatus may be displayed, and the user may select an appropriate apparatus.

Second Embodiment

In the first embodiment the image processing apparatus finds the total expected processing time and transmits the found time to the client terminal. The present embodiment differs from the first embodiment in that the image processing apparatus generates a dummy print job (hereinafter "dummy job") that requires approximately the same amount of time for execution as a received firmware rewriting job, and transmits this dummy job to a print server as a print job for the image processing apparatus itself. The following description focuses on the aspects of the second embodiment that differ from the first. Members that are the same as in the first embodiment have the same numbering, and a description thereof is omitted.

2-1 Overall Structure

Figures 18, 19:
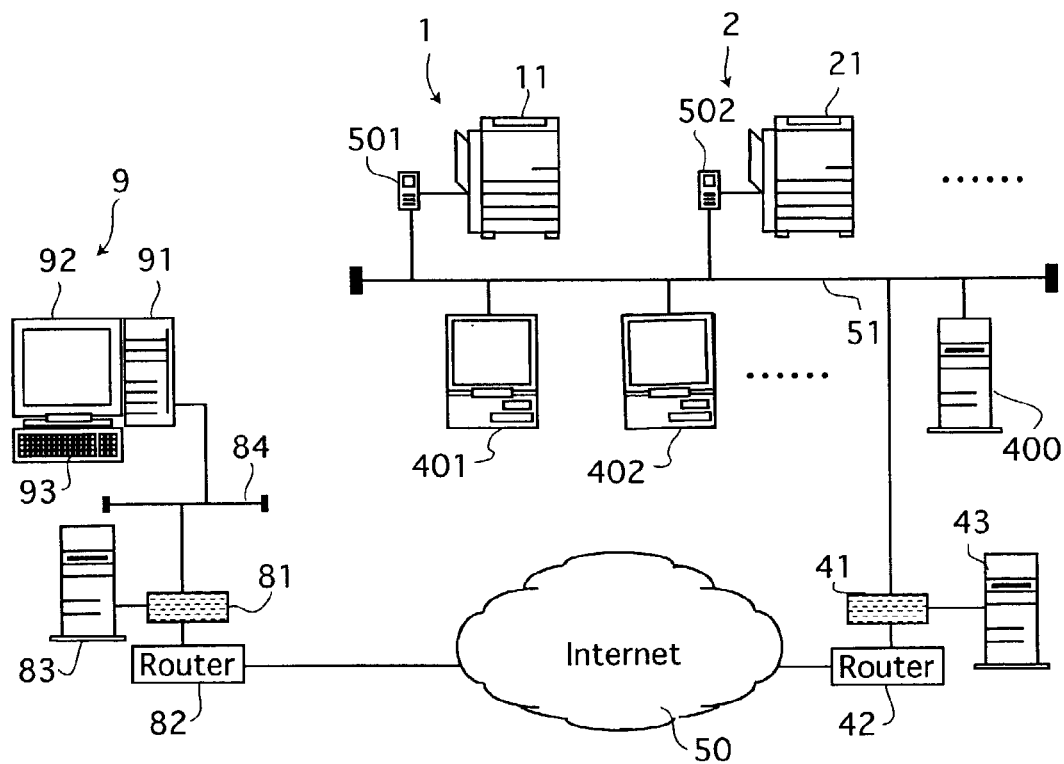
FIG. 18 shows an example of the contents of the registration information table.
FIG. 19 shows the overall structure of a system in the second embodiment.

FIG. 19 shows the overall structure of the system of the present embodiment. As the figure shows, in the present embodiment a print server 400 is connected to the LAN 51. Client terminals 401, 402 etc. are basically the same as the client terminals 31, 32 etc. The difference is that the client terminals 401, 402 etc. transmit print jobs to the print server 400.

The print server 400 enables the client terminals 401, 402 etc., which are connected to the LAN 51, to share the image processing apparatuses 1, 2 etc.

The image processing apparatus 1 is composed of an image forming apparatus 11 and a printer controller 501 that are connected to each other. The printer controller 501 has basically the same structure as the printer controller 12, but the processing content differs in that the printer controller 501 generates the aforementioned dummy jobs. The following describes this processing in detail.

2-2 Contents of Processing Performed by the Printer Controller 501

Figure 20:
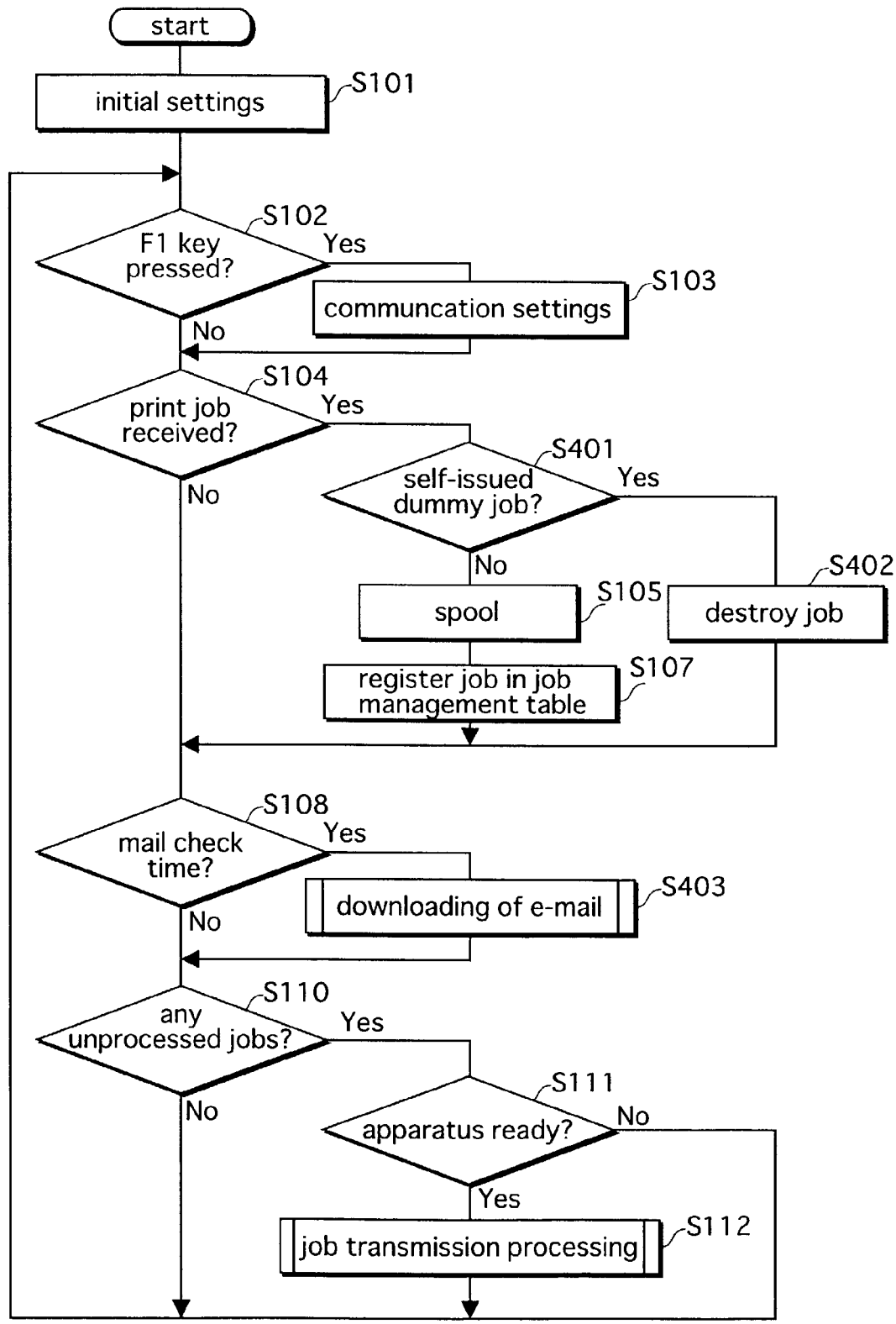
FIG. 20 is a flowchart showing the contents of processing executed by the print controller.

FIG. 20 is a flowchart showing the contents of processing performed by the printer controller 501.

As the figure shows, the processing is approximately the same as that performed by the printer controller 12 in the first embodiment (FIG. 11), however the flowchart in FIG. 20 does not have steps S106, and S113 to S115 in FIG. 11, but has additional steps S401, S402, S403. Steps S106, and S113 to S115 are deleted because the print server 400 calculates the expected processing times 1 and 2, as described later. The following description focuses on the processing at steps S401 to S403. A description is omitted of steps that have the same content, and thus the same numbering, as those in FIG. 11. Note that for convenience the processing for downloading e-mail at step S403 is described first, followed by the processing at steps S401 and s402.

Figure 21:
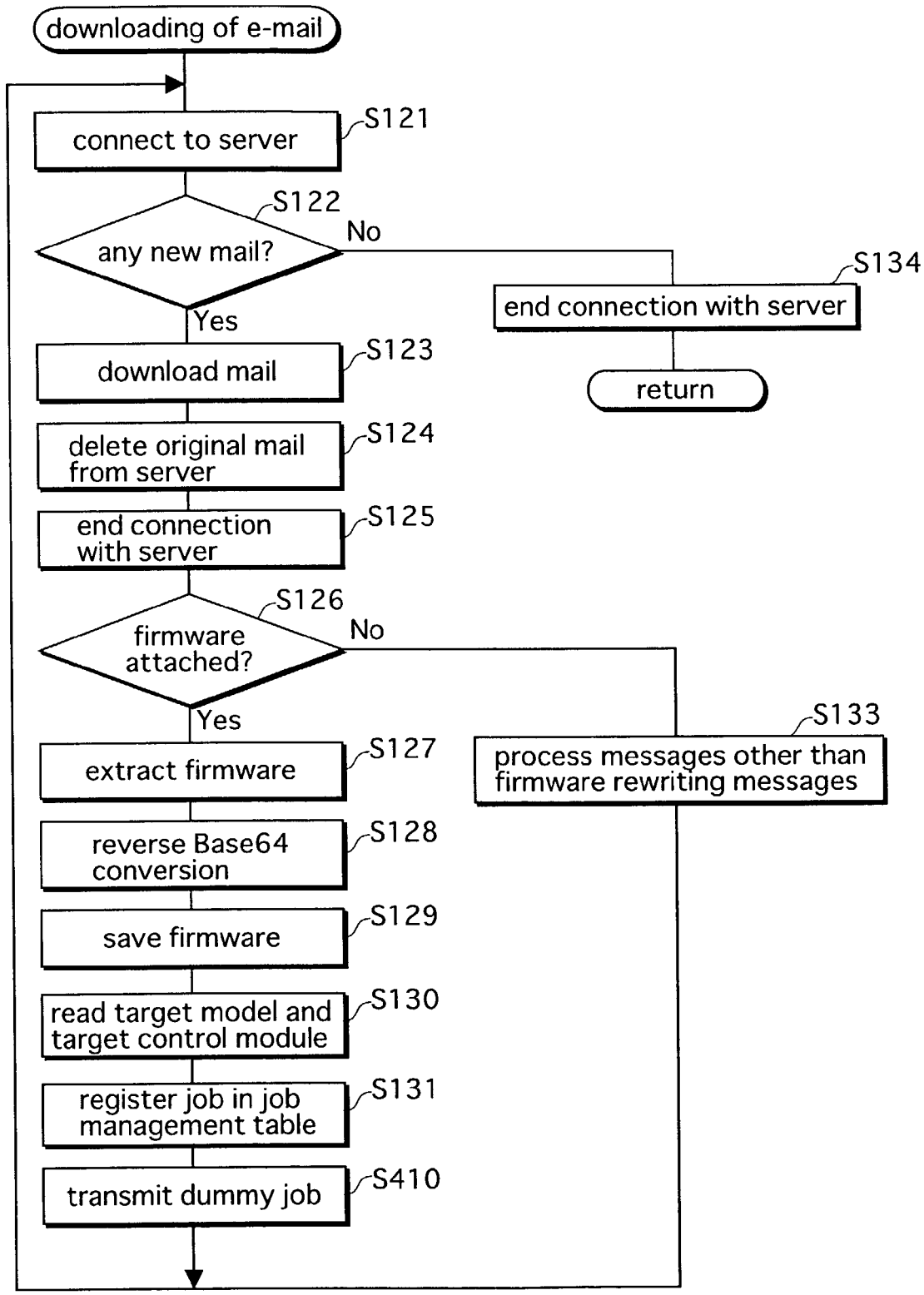
FIG. 21 is a flowchart showing the contents of an e-mail downloading processing sub-routine in the second embodiment.

FIG. 21 is a flowchart showing the content of a e-mail downloading processing sub-routine at step S403.

As the figure shows, the e-mail downloading processing is almost the same as that in FIG. 13 (step S110), but step S131 is deleted, and step S410 is added. Specifically, at steps S121 to S125 the printer controller 501 connects to the mail sever 43, and after downloading any new e-mail, ends the connection with the mail server 43. Then at steps S126 to S131, if there is firmware attached to the downloaded e-mail, the printer controller 501 extracts the firmware, stores the firmware in the hard disk drive 205, reads which module of which model that firmware is to be used to rewrite, and registers the information in the job management table 211.

After completing the processing at step S131, the printer controller 501 performs processing at step S410 to transmit a dummy job to the printer sever 400. Specifically, when a firmware rewriting job is to be executed, the printer controller 501 generates a dummy job having approximately the same processing time as the time expected to be required for the rewriting, and transmits the dummy job to the print server 400 as a job for the printer controller 501. The print controller 501 generates the dummy job in the following manner.

1. The print controller 501 finds the time expected to be required for the firmware rewriting. This expected time is equivalent to the expected processing time 2 found according to the Expression 2 described earlier.

2. The printer controller 501 finds the size of the dummy job. This is found according to the following Expression 3.

dummy job size=(expected processing time 2)/(processing time per unit of size)  (Expression 3)

Here "processing time per unit of size" is the same as that in Expression 1 described earlier.

3. The printer controller 501 generates a text file whose data is the same size as the found size, and generates a print job in which the text data is the print data.

Identification information that is a character string showing that the print job is a dummy job is listed at the head of the text file. Listed after the identification information is an arbitrary character string, for example a number string 1, 2 etc., whose size is equal to the size found according to Expression 3. Considering that firmware is a number of megabytes in size, this dummy job is far larger than general print jobs.

4. The printer controller 501 adds a header to the generated print job listing the transmission origin and the destination as the image processing apparatus 1.

As described above, the generated print job is transmitted to the print server 400, however as described later, since the destination is the image processing apparatus 1, the print server 400 transmits the print job to the image processing apparatus 1, resulting in the print job being returned to the printer controller 501.

In the e-mail downloading processing, the print controller 501 executes processing to transmit a dummy job to the print server 400 each time firmware is received. Note that the value of the "processing time per unit of size" and so on in the above-described Expressions 2 and 3 is pre-stored in the EP-ROM 202, and read when calculation is performed.

Returning to FIG. 20, at step S401 the printer controller 501 judges whether a print job sent from the print server 400 is a dummy job that the printer controller 501 issued itself. This judgement is made by confirming whether there is identification information that was written by the print controller 501 itself in the print job. On judging that the job is such a dummy job (step S401, Yes), the printer controller 501 deletes the job (step S402), and proceeds to step S108. On the other hand, on judging that the job is not a dummy job, in other words that the job is a print job from a client terminal (step S401, No), the printer controller 501 proceeds to step S105, and after spooling the job, at step S107 registers the job in the job management table 211.

Note that this structure is the same for the other image processing apparatuses 2 etc. and printer controllers 502 etc.

2-3 Contents of Processing of the Print Server 400

On receiving a print job from one of the client terminals 31, 32 etc., the print server 400 registers the print job in a print job queue (not illustrated). The print server 400 reads print jobs on a FIFO (First-In First-Out) basis, and sends each read print job to an image processing apparatus. The print server 400 has a table the same as the registration information table 311 shown in FIG. 18, and is therefore able to know the model names, total expected processing time and so on about each image processing apparatus connected to the LAN 51.

Note that in the present embodiment the values in the total expected processing time column are decremented by 1 according to a timer. When sending a print job to an image processing apparatus, the print server 400 finds the processing time expected to be required for the image processing apparatus to execute the print job (expected processing time 3), adds the found time to the current value in the total expected processing time column, and overwrites the current value with the value obtained by adding, as a new total expected processing time. Here, the total expected processing time 3 is found according to the following Expression 4.

Expected processing time 3=(print data size)*(destination apparatus print processing time per unit of size)  (Expression 4)

When the expected processing time 3 is founding according to Expression 4, it is necessary for the print server 400 to obtain in advance information about the processing time per unit of size of the destination image processing apparatus.

For example, in a case where the current value in the total expected processing time column is 100 seconds, and an expected processing time 60 seconds of a print job to be transmitted to the image processing apparatus is added to the current value, the current value is overwritten with a new value 160. This 160 shows the time expected to be required, at the point of overwriting, for all print jobs being executed and in a wait state in the image processing apparatus. Accordingly, if no new print jobs are transmitted to the image processing apparatus, all print jobs finish in 160 seconds for the image forming apparatus 11, and the value of the total expected processing time column in the table in the print server 400 becomes 0.

The print server 400 performs this kind of processing each time it transmits a print job to an image processing apparatus. The print server 400 is able to know the actual waiting time at that point for each image processing apparatus by referring to the corresponding total expected processing time, therefore it is able to select the apparatus having the shortest wait time as a destination before transmitting a new print job. Note that the total expected processing time is not limited to being found according to Expression 4, but instead the expected processing time may be simply considered to be the print data size. Here, the print data size written in the total expected processing time column. This method also allows the state of print jobs in the wait states in each image processing apparatus to be known relative to each other, and the image processing apparatus having the shortest wait time to be selected.

Figure 22:
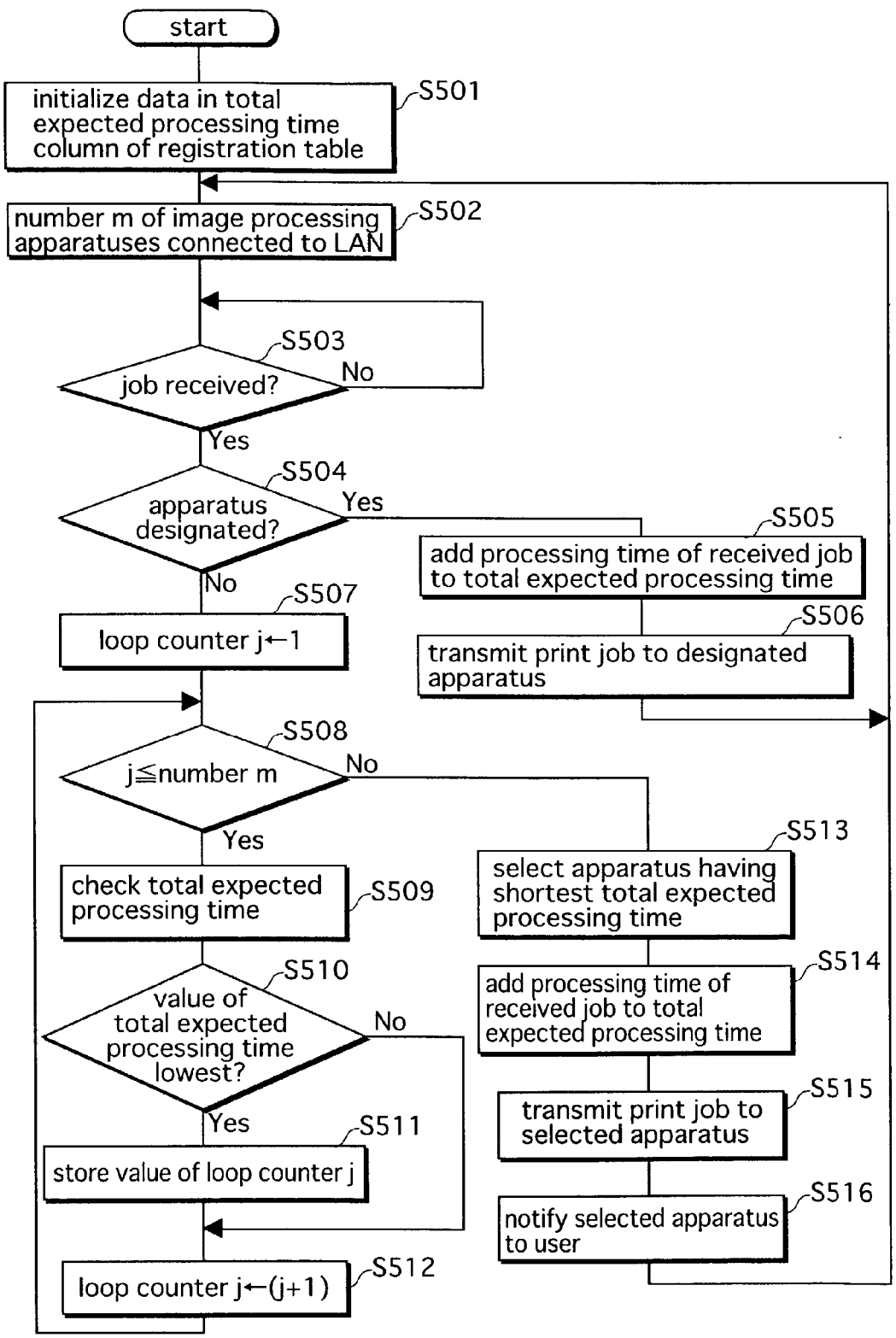
FIG. 22 is a flowchart showing the contents of processing executed by the server.

The following describes content of processing executed by a control unit (not illustrated) of the print server 400, with use of the flowchart in FIG. 22.

As shown in FIG. 22, when the print server 400 is turned on, the control unit first resets all the values in the total expected processing time column in the registration information table to 0 (step S501).

Then the control unit calculates the number m of image processing apparatuses 1, 2 etc. (step S502), by referring to the registration information table.

Next, the control unit judges which of the client terminals 31, 32 etc. a print job was received from (step S503).

On judging which client terminal the print job was received from, the control unit then judges if a destination image processing apparatus is designated (step S504). This judgement is made, both in the case of a print job received from a client terminal and in the case of a dummy job from an image processing apparatus, according to whether information designating the destination (apparatus) is included in the header section.

On judging that the apparatus is designated (step S504, Yes), the control unit finds the expected processing time 3 for the print job according to the Expression 4, adds the found value to the current value in the total expected processing time column for the designated image processing apparatus in the registration information table, and overwrites the current value with the value obtained by adding (step S505). Then the control unit transmits the print job to the designated image processing apparatus (step S506), and returns to step S502.

On the other hand, on judging that the apparatus is not designated (step S504, No), the control unit sets the loop counter j to 1 (step S507), and compares j with the number m (step S508). Here, since j is considered to equal 1, the control unit judges that j is less than or equal to m, and refers to the current value of the total expected processing time column for the apparatus registered in the j-th, here the first, record in the registration information table (step S509).

Next, the control unit judges whether the value of the total expected processing time is the lowest (step S510). Here, since only the first record has been referred to, the control unit judges "Yes", and stores that value of j, in other words 1 (step S511). At step S512, the control unit increments the current value of the loop counter, here j=1, by 1, and returns to step S508.

At step S508, the control unit judges whether 2 is equal to or less than m, and if so, executes the processing from steps S509 to S512 for the apparatus registered in the second record in the registration information table. Here, if for example the second apparatus is judged at step S510 to have the lowest value for the total expected processing time, the control apparatus stores "2" instead of "1" as j the lowest value of the total expected processing time. On the other hand, if the control unit judges that the value of the total expected processing time of the second apparatus is not the lowest, it proceeds to step S512.

The control unit repeats the processing at steps S509 to S512 until j is no longer equal to or less than m at step S508, and finds the apparatus having the shortest total expected processing time. Then, after judging that j is not equal to or less than m (step S508, No), the control unit proceeds to step S513.

At step S513, the control unit selects the apparatus of the record whose j value was stored at step S511, as the apparatus having the lowest value for total expected processing time. Then, the control unit finds the total expected processing time 3 for the print job, adds the value of the found time to the current value in the total expected processing time column for the selected apparatus in the registration information table, and overwrites the current value with the value obtained by adding (step S514).

Next, the control unit transmits the print job to the selected image processing apparatus (step S515), transmits information showing the apparatus to the client terminal from which the print job was originally sent (requested), to inform the user which apparatus the print job has been sent to (step S516), and returns to step S502.

As has been described, on receiving firmware, the image processing apparatuses 1, 2 etc. of the present embodiment generate a dummy job destined for the image processing apparatus itself, whose expected processing time is approximately the same as the processing time expected to be required for executing the firmware rewriting job. Then the image processing apparatus transmits the dummy job to the print server 400 just as if the image processing apparatus itself was a client terminal. Meanwhile, the print server 400 receives print jobs from the client terminals and dummy print jobs from the image processing apparatuses. The print server 400 manages the total expected processing time for each image processing apparatus in the registration information table, and if the destination of a received print job is not designated, transmits the print job to the image processing apparatus that has the lowest total expected processing time value at that time, in other words the image processing apparatus that has the shortest wait time.

Taking for example a case in which the print server 400 receives a dummy job from the image processing apparatus 2, a value is written in the total expected processing time column for the image processing apparatus 2 in the registration information table that is far greater than that of other image processing apparatuses. An example of this is the total expected processing time for "model2" shown in FIG. 18. This means that the dummy job is transmitted to the image processing apparatus 2 since the destination is designated as the image processing apparatus 2. However, if the print server 400 receives a print job from one of the client terminals soon after transmitting the dummy job, the received print job is transmitted to the image processing apparatus, excluding the image processing apparatus 2, that has the shortest wait time. This has an effect of avoiding the problem in a conventional system where a print job is kept waiting for a long time due to firmware rewriting. This allows the user to have their desired printed matter quickly. Furthermore, the dummy job is, of course, destroyed in the image processing apparatus 2, meaning that is not printed out. This avoids wasting of paper.

Furthermore, the print server 400 need only have a conventional function of being able to select an image processing apparatus as a destination for a received print job based on the time expected to be required for each image processing apparatus to execute the print jobs that are already in a wait state or being executed. In other words it is not necessary for the print server 400 to have a structure in which it detects the state of execution of firmware rewriting jobs. For example, the aforementioned effects can be obtained by connecting the image processing apparatus of the present embodiment to an existing system that has the aforementioned function. This has a huge cost advantage.

The print controller 501 is described as generating a dummy job by creating a data file that lists a character string equal in size to the size of the dummy job found according the Expression 3. However, there are cases in which firmware that is extremely large in size takes up a large amount of space in the memory. One way to overcome this problem is to create a file that has only one page's worth of text, and specify in the header section the number of times the text file is to be printed out. Then the print job (dummy job) is transmitted to the print server, which judges the size of the print job accordingly, and selects the image processing apparatus to transmit the dummy job to, based on the size of the dummy job. Another possible way is to transmit only data that shows the size of the dummy job to the print server as a print job, rather than generating a text file, and have the print server judge the size of the print job accordingly.

Modifications

The present invention is not limited to the above-described embodiments. The following describes examples of possible modifications.

(1) In the first embodiment, the client terminal inquires to each image processing apparatus about the total expected processing time, and after receiving the total expected processing time from each image processing apparatus, selects that with the shortest total expected processing time as the transmission destination for a print job. However, this processing may be executed by a server in a system.

An example of the system in this case is the system shown in FIG. 19. Here, a plurality of client terminals, a server, and a plurality of image processing apparatuses are connected to the LAN 51, and each client terminal makes print job requests to the server. The server receives a print job from a client server (receives a request), executes processing the same as the processing shown in FIG. 17 that the client terminal 31 executes, and transmits the print job to the image processing apparatus expected to have the shortest wait time. Note that in this case the processing at step S155 is replaced with processing for transmitting information showing the selected apparatus to the client terminal that is the transmission origin of the print job.

In this way, even if the server has a structure of performing processing to select the image processing apparatus having the shortest total expected processing time, an effect can be obtained that the user who issued the print job is rarely caused by firmware rewriting processing to wait longer than expected.

(2) In the above-described embodiments the client terminal makes a request to the image processing apparatus for an image processing job as a print job, however the image processing job may be a scan job in which the image processing apparatus reads an image of a document set in the image processing apparatus, and transmits the read image data to the originator of the request. In such a case, the expected processing time 1 is the time expected to be required to execute the scan job, and the time is found by, for example, (document size)*(processing time per unit of time).

(3) In the first embodiment the printer controller 12 transmits a total expected processing time required to execute firmware rewriting jobs and image processing jobs that are in a wait state (unprocessed), however, the information that is transmitted does not have to be the time itself. Information, such as the number or size of jobs in the wait state, that gives an indication of the total expected processing time may be sent as "information about the total expected processing time". Furthermore, the information is not limited to being transmitted only when there has been a request from the client terminal, but may be transmitted, for example, at an arbitrary interval, such as once every several seconds, to either an arbitrary client terminal or to each client terminal.

Furthermore, the total expected processing time is not limited to being for unprocessed image processing jobs only, but may also include the processing time expected to be required to complete a job that is being executed (remaining time). Taking an example of a firmware rewriting job, the remaining time may be found by successively decrementing the value of the expected processing time 2 from when the rewriting starts, and using the value at the point when the total expected processing time is calculated as the time expected to be required until the job is complete. This remaining time is added to the expected processing time of unprocessed image processing jobs (the jobs registered in the job management table 211), and the obtained time transmitted to the client terminal as the total processing time. The apparatus having the shortest wait-time can be selected at the client terminal, with knowledge of processing time of jobs that are currently being executed in the image processing apparatuses. For example, considering a case in which a client terminal requests the total expected processing time soon after a firmware rewriting job has begun in an image processing apparatus, it is likely that it will be some time before the job is finished, therefore value of the total expected processing time will be high. Accordingly, it is highly likely that when a new print job is transmitted from the client terminal that the image processing apparatus currently executing the firmware rewriting job will not be selected as the transmission destination of the print job. As a result, an effect can be obtained that it is even more unlikely that the user who issues the print job will be caused to wait a long time by the firmware rewriting.

(4) The above-described embodiments describe an example of firmware being transmitted attached to e-mail, however other means may be used to obtain firmware. For example, the printer controller 12 may be made to read the firmware directly from a CD-ROM or the like on which the firmware is recorded.

(5) In the above-described embodiments, firmware is shows as basic software such as activation programs, input/output programs, and control programs for image processing, driving members executed by the modules in the image processing apparatus, and control data. However, firmware may for example be types of programs and data that are not modified automatically by a computer during computing processing, or that are programs and data that are not changed by the user. For example, activation programs and input/output programs such as an OS (operating system), an interpreter, a compiler, and BIOS.

(6) In the above-described embodiments, input of copy jobs and image information transmission jobs are not received from the operation panel 119 while print jobs and the like are being executed, however a structure in which, for example, copy jobs are received while a print job is being executed is possible.

In this case the CPU 111 and the printer controller 12 perform the following processing. The CPU 111 only reads an image of the document, and temporarily stores the image data. The CPU 111 also transmits a signal to the printer controller 12 that a copy job has been received. The printer controller 12 registers the copy job in the job management table 211, and when it is time for the job to be executed, instructs the CPU 111 to execute the job.

The CPU 111 receives the instruction, reads the stored image data of the document, a executes printing processing based on the image data. When there are jobs in the wait state, it possible to find the expected processing time of the copy job and add this to the total of the jobs that are in the wait state, to obtain a total expected processing time. Note that the expected processing time of a copy job may be found according to (number of pages in document)*(number of copies)*(processing time per sheet). Here, the processing time per sheet is found in advance by experiments and the like.

(7) In the embodiment the image forming apparatus 11 and the printer controller 12 are separate apparatuses, however the printer controller 12 may be internalized in the image forming apparatus 11. Furthermore, an example is used of an MFP as the image processing apparatus, but the present invention may be applied to any general image processing apparatus that executes image processing jobs, such as a printer, a scanner and a facsimile.

(8) The present invention is described in the above-described embodiments as being applied to an image forming apparatus, but is not limited to being so. The present invention may be a program for having a computer execute the described processing.

Furthermore, the present invention may be the program recorded on a computer readable recording medium such as a flexible disk, a hard disk, a CD-ROM, an MO, a DVD, a DVD-ROM, a DVD-RAM and a semiconductor memory.

Furthermore, it is not necessary for the program of the present invention to include all the modules for having a computer execute the described processing. For example, various general-use programs, such as a communication program or an OS, that are installed separately may be used to have a computer execute the processing of the present invention. Furthermore, the present invention may be applied to a management apparatus (printer controller) that manages the image forming apparatus.

Although the present invention has been fully described by way of examples with reference to the accompanying drawings, it is to be noted that various changes and modification swill be apparent to those skilled in the art. Therefore, unless otherwise such changes and modification s depart from the scope of the present invention, they should be construed as being included therein.

What is claimed is:

1. An image processing apparatus that is connected to a network, comprising:
   a firmware rewriting unit that executes a firmware rewriting job for rewriting firmware in the image processing apparatus to new firmware;
   a generation unit that generates information about a processing time expected to be required to execute the firmware rewriting job; and
   a transmission unit that transmits the generated information to an external apparatus via the network, wherein
   the generation unit generates, as the information about the processing time, a dummy image processing iob whose destination is the image processing apparatus, so that a processing time is substantially the same as the processing time expected to be reguired for executing the firmware rewriting job.

2. The image processing apparatus of claim 1, further comprising:
   a reception unit that receives a request to transmit the information from a client terminal that is connected to the network,
   wherein the generation unit generates the information on the reception unit receiving the request, and
   the transmission unit transmits the generated information to the client terminal, the client terminal being the external apparatus.

3. The image processing apparatus of claim 1, further comprising:
   an image processing unit that executes an image processing job based on the new firmware after rewriting,
   wherein the generation unit, when an image processing job is in a wait state in the image processing apparatus, generates information showing a time that is a processing time expected to be required to execute the image processing job added to the processing time expected to be required to execute the firmware rewriting job.

4. The image processing apparatus of claim 3, wherein the generation unit finds the processing time expected to be required to execute the firmware rewriting job by multiplying a size of the firmware by a rewriting processing time per unit of size, and finds the processing time expected to be required to execute the image processing job by multiplying a size of the image processing job by a job processing time per unit of size.

5. The image processing apparatus of claim 1, wherein the generation unit adds identification information showing that the image processing job is a dummy job to data of the image processing job.

6. The image processing apparatus of claim 5, further comprising:
   a reception unit that receives the image processing job;
   a judgement unit that judges whether the received image processing job is a dummy job generated by the image processing apparatus; and
   a deletion unit that, when the judgment unit judges that the received image processing job is a dummy job, deletes the received image processing job.

7. The image processing apparatus of claim 1, further comprising:
   a reception unit that is connected to the network via a serial interface, and receives via the serial interface firmware transmitted via the network, as the new firmware.

8. The image processing apparatus of claim 1, further comprising:
   a plurality of control modules that are connected to each other via serial interfaces, and each control module having a non-volatile memory for storing firmware,
   wherein the firmware rewriting unit, when rewriting firmware, sends the new firmware to each module via the serial interface, and rewrites the firmware currently stored in the non-volatile memory to the new firmware.

9. An image processing apparatus that is connected to a print server via a network, comprising:
   a firmware rewriting unit that executes a firmware rewriting job for rewriting firmware in the image processing apparatus to new firmware;
   an image processing unit that executes an image processing job based on the new firmware after rewriting;
   a generation unit that generates a dummy image processing job whose destination is the image processing apparatus, so that a processing time is substantially the same as the processing time expected to be required for executing the firmware rewriting job; and
   a transmission unit that transmits the generated dummy job to the print server.

10. The image processing apparatus of claim 9, wherein the generation unit adds identification information showing that the image processing job is a dummy job to data of the image processing job.

11. The image processing apparatus of claim 10, further comprising:
    a judgement unit that judges whether the received image processing job is a dummy job generated by the image processing apparatus; and
    a deletion unit that, when the judgment unit judges that the received image processing job is a dummy job, deletes the received image processing job.

12. The image processing apparatus of claim 9, further comprising:
    a reception unit that receives a request to transmit the information from the client terminal, wherein the generation unit generates the information on the reception unit receiving the request.

13. The image processing apparatus of claim 9, wherein the generation unit finds the processing time expected to be required to execute the firmware rewriting job by multiplying a size of the firmware by a rewriting processing time per unit of size, and finds the processing time expected to be required to execute the image processing job by multiplying a size of the image processing job by a job processing time per unit of size, the total processing time being a sum of the obtained processing times.

14. An image processing method that is executed in a system that includes a client terminal that is connected to plurality of image processing apparatuses via a network, each image processing apparatus including a unit that executes a firmware rewriting job for rewriting firmware in the image processing apparatus to new firmware, and each image processing apparatus executing an image processing job based on the new firmware after rewriting, the method comprising:
    a first step of the client terminal requesting each image processing apparatus to transmit information about a total processing time expected to be required to execute all image processing jobs that are in a wait-state in the image processing apparatus, and generating, as the information about the processing time, a dummy image processing job whose destination is the image processing apparatus, so that a processing time is substantially the same as the processing time expected to be required for executing the firmware rewriting job;
    a second step of each of the image processing apparatuses receiving the request from the client terminal, and transmitting the information to the client terminal;
    a third step of the client terminal selecting a transmission destination for an image processing job, based on the received information; and
    a fourth step of the client terminal transmitting the image processing job to the transmission destination selected at the third step.

15. An image processing method that is executed by image processing apparatuses that is connected to a server, the image processing apparatus including a unit that executes a firmware rewriting job for rewriting firmware in the image processing apparatus to new firmware, and the image processing apparatus executing an image processing job based on the new firmware after rewriting, the method comprising:
    a first step of generating a dummy image processing job whose destination is the image processing apparatus, so that a processing time is substantially the same as the processing time expected to be required for executing the firmware rewriting job; and
    a second step of transmitting the generated dummy image processing job to the server by acting as a client terminal in relation to the server.

16. A management apparatus that is connected to an image forming apparatus and that is connected via a network to a client terminal, the image forming apparatus executing a firmware rewriting job for rewriting firmware in the image forming apparatus to new firmware and executing an image processing job based on the new firmware after rewriting, the management apparatus comprising:
    a first reception unit that receives a firmware rewriting job from the network;
    a second reception unit that receives an image processing job from the client terminal;
    a first transmission unit that transmits the received image processing job to the image forming apparatus when the image forming apparatus is in a state in which an image processing job can be executed, and transmits the received firmware rewriting job to the image forming apparatus when the image forming apparatus is in a state in which a firmware rewriting job can be executed;
    a generation unit that generates information about a total processing time expected to be required to execute all firmware rewriting jobs and image processing jobs that are in a wait-state in the image forming apparatus; and
    a second transmission unit that transmits the generated information to the client terminal, wherein
    the generation unit generates, as the information about the processing time, a dummy image processing job whose destination is the image processing apparatus, so that a processing time is substantially the same as the processing time expected to be required for executing the firmware rewriting job.

* * * * *